US012148355B1

(12) United States Patent
Watsuda

(10) Patent No.: US 12,148,355 B1
(45) Date of Patent: Nov. 19, 2024

(54) PIXEL CIRCUIT FOR WIDE BRIGHTNESS RANGE DISPLAY

(71) Applicant: InnoLux Corporation, Miao-Li County (TW)

(72) Inventor: Hirofumi Watsuda, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/221,378

(22) Filed: Jul. 12, 2023

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2300/0819* (2013.01); *G09G 2300/0852* (2013.01); *G09G 2300/0861* (2013.01); *G09G 2310/08* (2013.01); *G09G 2320/0626* (2013.01); *G09G 2360/144* (2013.01)

(58) Field of Classification Search
CPC ................... G09G 3/2096; G09G 3/32; G09G 2300/0819; G09G 2300/0852; G09G 2300/0861; G09G 2310/08; G09G 2320/0626; G09G 2360/144
See application file for complete search history.

(56) References Cited

U.S. PATENT DOCUMENTS

| | | | | |
|---|---|---|---|---|
| 11,122,660 | B2 | 9/2021 | Chiang | |
| 2019/0057651 | A1* | 2/2019 | Li | G09G 3/3233 |
| 2020/0221554 | A1* | 7/2020 | Chiang | H05B 45/44 |
| 2020/0302863 | A1* | 9/2020 | Xuan | G09G 3/3233 |

* cited by examiner

*Primary Examiner* — Brent D Castiaux
(74) *Attorney, Agent, or Firm* — Winston Hsu

(57) ABSTRACT

A pixel circuit includes a switching transistor, a first driving transistor, a second driving transistor, a first emission control transistor, a second emission control transistor, and a light emitting diode. The first driving transistor is coupled the switching transistor. The second driving transistor is coupled to the switching transistor. The first emission control transistor is coupled to the first driving transistor. The second emission control transistor is coupled to the second driving transistor. The light emitting diode is coupled to the first emission control transistor and the second emission control transistor.

20 Claims, 16 Drawing Sheets

PIXEL CIRCUIT FOR WIDE BRIGHTNESS RANGE DISPLAY

BACKGROUND OF THE DISCLOSURE

1. Field of the Disclosure

The disclosure relates to pixel circuits, and more particularly to pixel circuits and driving schemes for wide brightness range.

2. Description of the Prior Art

A pixel circuit is a circuit that controls the brightness of a pixel on a display. In an active matrix pixel circuit, each pixel has its own transistor. The transistor is used to control the flow of current to the pixel. The transistor is turned on and off by a digital signal. When the transistor is turned on, current flows through the pixel causing the pixel to light up. When the transistor is turned off, no current flows through the pixel, and it turns off.

A pixel circuit driving scheme is a method of controlling the brightness of pixels in a light-emitting diode (LED) display. The most common pixel circuit driving scheme is the 2T1C (two transistors, one capacitor) scheme. This scheme uses two transistors and one capacitor to control the current flowing through the LED. The first transistor is used to select the pixel, and the second transistor is used to transfer the signal from the data line. The capacitor is used to store the charges that are used to turn on the LED.

However, the above-mentioned pixel circuit and driving scheme cannot satisfy the need to cover wide range of display brightness, that is, high brightness for day time and low brightness for night time. For most active matrix LED displays, brightness is controlled by the driving current of the LEDs, such that the driving circuit needs to produce a wide range of driving current. At present, it is technically difficult to cover such wide range of driving current with only one driving transistor. Thus, the luminance level of the display the may not be accurate.

SUMMARY OF THE DISCLOSURE

An embodiment provides a pixel circuit including a switching transistor, a first driving transistor, a second driving transistor, a first emission control transistor, a second emission control transistor, and a light emitting diode. The first driving transistor is coupled to the switching transistor. The second driving transistor is coupled to the second terminal of the switching transistor. The first emission control transistor is coupled to the first driving transistor. The second emission control transistor is coupled to the second driving transistor. The light emitting diode is coupled to the first emission control transistor and the second emission control transistor.

Another embodiment provides another pixel circuit including a switching transistor, a first driving transistor, a second driving transistor, a first emission control transistor, a second emission control transistor, a capacitor, a light emitting diode, a first emission control line and a second emission control line. The first driving transistor is coupled to a second terminal of the switching transistor. The second driving transistor is coupled to the switching transistor. The first emission control transistor is coupled to the first driving transistor. The second emission control transistor is coupled to the second driving transistor. The capacitor is coupled between a first terminal of the first emission control transistor and a control terminal of the first driving transistor. The light emitting diode is coupled to the first driving transistor and the second driving transistor. The first emission control line is coupled to the first emission control transistor. The second emission control line is coupled to the second emission control transistor. The first emission control line provides a first signal having a first duty cycle to the first emission control transistor, and the second emission control line provides a second signal having a second duty cycle to the second emission control transistor.

These and other objectives of the present disclosure will no doubt become obvious to those of ordinary skill in the art after reading the following detailed description of the embodiment that is illustrated in the various figures and drawings.

DETAILED DESCRIPTION

Figure 1:
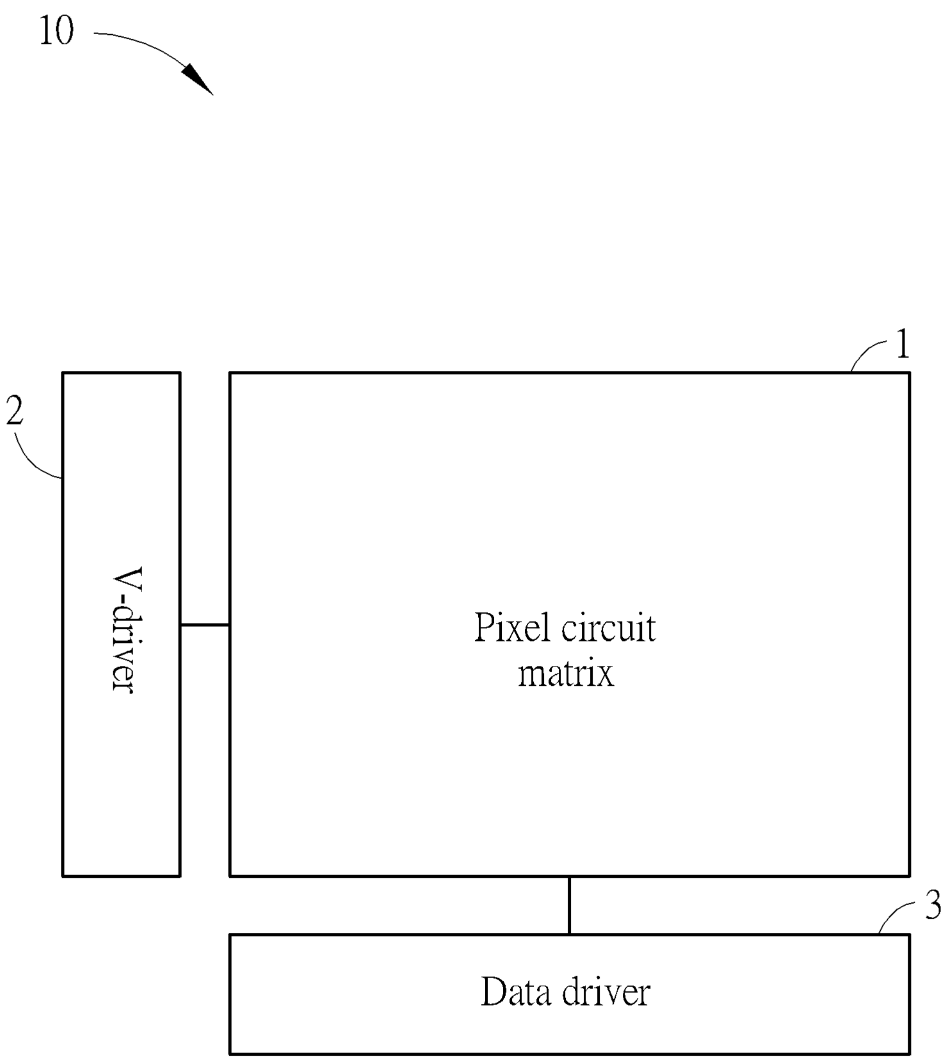
FIG. 1 illustrates a schematic diagram of a display panel of an embodiment.

The present disclosure may be understood by reference to the following detailed description, taken in conjunction with the drawings as described below, and for purposes of illustrative clarity and being easily understood by the readers, various drawings of this disclosure may be simplified, and the elements in various drawings may not be drawn to scale. In addition, the number and dimension of each element shown in drawings are just illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function. In the following description and in the claims, the terms "comprise", "include" and "have" are used in an open-ended fashion, and thus should be interpreted to mean "include, but not limited to . . . ".

The direction terms used in the following embodiment such as up, down, left, right, in front of or behind are just the directions referring to the attached figures. Thus, the direction terms used in the present disclosure are for illustration, and are not intended to limit the scope of the present disclosure. It should be noted that the elements which are specifically described or labeled may exist in various forms for those skilled in the art. Besides, when a layer is referred to as being "on" another layer or substrate, it may be directly on the other layer or substrate, or may be on the other layer or substrate, or intervening layers may be included between other layers or substrates.

Besides, relative terms such as "lower" or "bottom", and "higher" or "top" may be used in embodiments to describe the relative relation of an element to another element labeled in figures. It should be understood that if the labeled device is flipped upside down, the element in the "lower" side may be the element in the "higher" side.

The ordinal numbers such as "first", "second", etc. are used in the specification and claims to modify the elements in the claims. It does not mean that the required element has any previous ordinal number, and it does not represent the order of a required element and another required element or the order in the manufacturing method. The ordinal number is just used to distinguish the required element with a certain name and another required element with the same certain name.

It should be noted that the technical features in different embodiments described in the following may be replaced, recombined, or mixed with one another to constitute another embodiment without departing from the spirit of the present disclosure.

In the present disclosure, the electronic device may include a display panel, an antenna device, a sensing device, a tiled device, or a transparent display device but is not limited thereto. The electronic device may include a rollable, stretchable, bendable, or flexible electronic device.

The display panel may include, for example, liquid crystal materials, light-emitting diodes (LED), quantum dot (QD) materials, fluorescence materials, phosphor materials, or other suitable materials, and the above materials may be arbitrarily arranged and combined. The light-emitting diodes may include, for example, organic light-emitting diode (OLED), mini LED, micro LED or quantum dot LED (QLED), but is not limited thereto.

Figure 2:
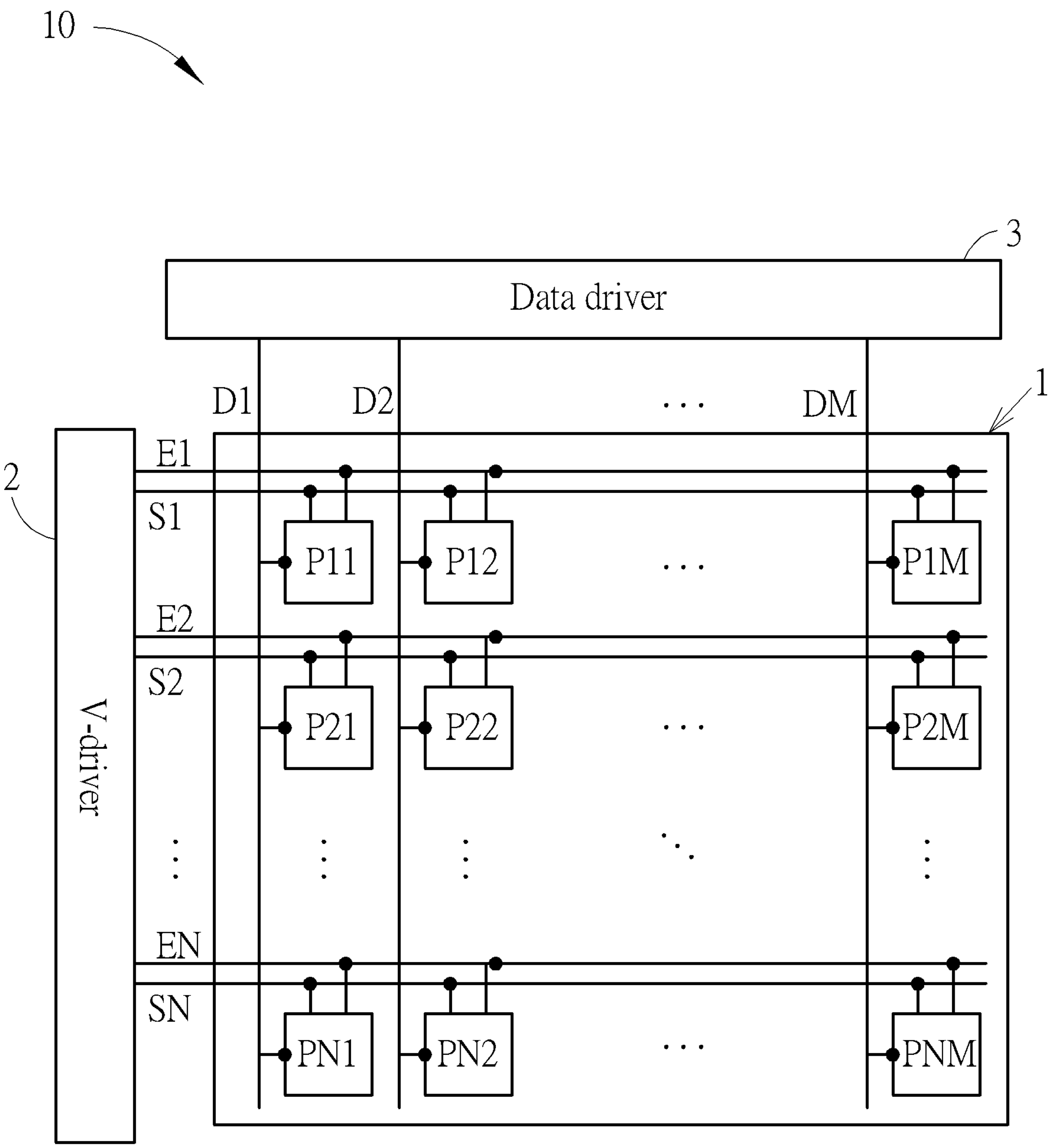
FIG. 2 illustrates a circuit diagram of the display panel of FIG. 1.

FIG. 1 illustrates a schematic diagram of a display panel 10 of an embodiment. FIG. 2 illustrates a circuit diagram of the display panel 10. As shown in FIGS. 1 and 2, the display panel 10 includes a pixel circuit matrix 1, a vertical driver (V-driver) 2 and a data driver 3. The pixel circuit matrix 1 includes a plurality of pixels P11-PNM, which are located in regions where a plurality of scan lines S1-SN and a plurality of emission control lines E1-EN intersect a plurality of data lines D1-DM. The pixel circuit matrix 1 displays an image according to an applied data voltage.

The vertical driver 2 may generate scan signals and emission control signals. In some embodiments, the vertical driver 2 may also generate compensation signals. The vertical driver 2 sequentially supplies scan signals to scan lines S1-SN in response to scan control signals (i.e., a start pulse and a clock signal). The vertical driver 2 also supplies emission control signals to emission control lines E1-EN in response to a start pulse and a clock signal output. The data driver 3 supplies data voltages corresponding to RGB (red, green, and blue) data to data lines D1-DM in response to data control signals.

Each of the pixels P11-PNM includes R, G, and B pixel circuits. In the pixel circuit matrix 1, the R, G, and B pixel circuits have the same circuit construction and emit R, G, and B light with brightness corresponding to current supplied to pixel circuit. Thus, each of the pixels P11-PNM combines light emitted from the R, G, and B pixel circuits and displays a specific color according to the combination of pixel color and brightness.

Figure 3:
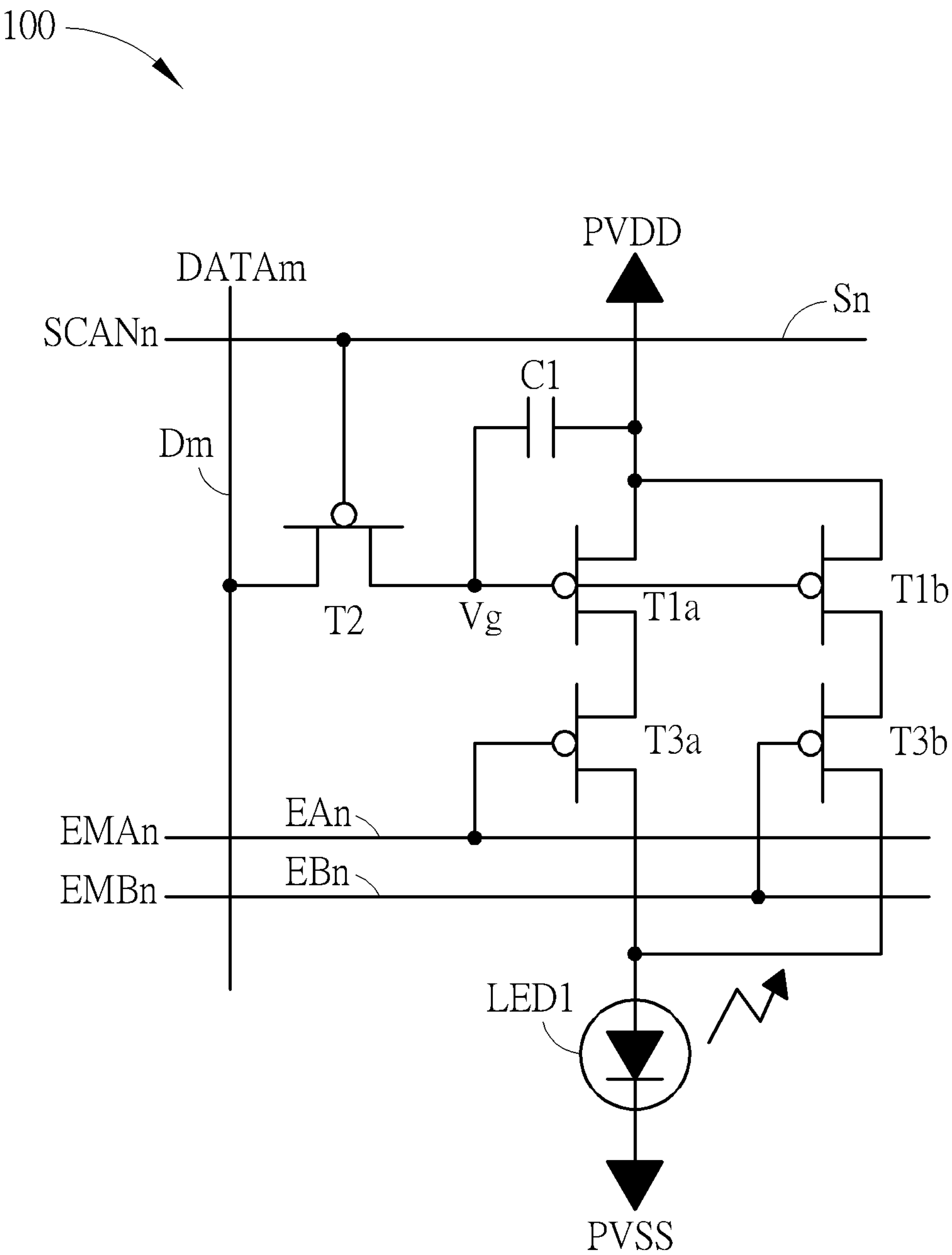
FIG. 3 illustrates a diagram of a pixel circuit of an embodiment.

FIG. 3 illustrates a diagram of a pixel circuit 100 of an embodiment. The pixel circuit 100 may be a pixel circuit Pnm ($1 \leq m \leq M$, $1 \leq n \leq N$) in one of the pixels P11-PNM, with some variations. The pixel circuit 100 includes a switching transistor T2, a driving transistor T1*a*, a driving transistor T1*b*, an emission control transistor T3*a*, an emission control transistor T3*b*, a capacitor C1, and a light emitting diode LED1. The switching transistor T2, the driving transistors T1*a* and T1*b*, and the emission control transistors T3*a* and T3*b* each includes a first terminal, a second terminal and a control terminal. The control terminals of the driving transistor T1*a* and the driving transistor T1*b* are both coupled to the second terminal of the switching transistor T2. The second terminal of the driving transistor T1*a* can be coupled to the first terminal of the emission control transistor T3*a*. The second terminal of the driving transistor T1*b* can be coupled to the first terminal of the emission control transistor T3*b*. The light emitting diode LED1 can be coupled to the second terminal of the emission control transistors T3*a* and the second terminal of the emission control transistor T3*b*. The capacitor C1 can be coupled between the control terminal of the driving transistor T1*a* and the voltage source PVDD (i.e., DC voltage). The control terminal of the switching transistor T2 can be coupled to a scan line Sn. The first terminal of the switching transistor T2 can be coupled to a data line Dm. The control terminal of the emission control transistor T3*a* can be coupled to an emission control line EAn, and the control terminal of the emission control transistor T3*b* can be coupled to another emission control line EBn.

The scan line Sn provides a scan signal SCANn to turn on the switching transistor T2 so that the data line Dm writes the data signal DATAm to the control terminals of the driving transistors T1*a* and T1*b*. The driving current is controlled by the driving transistors T1*a* and T1*b* according to the data signal DATAm input through the switching transistor T2. The capacitor C1 can store the charges for turning on the driving transistors T1*a* and T1*b*. The voltage PVDD is provided to the first terminal of the driving transistor T1*a* and the first terminal of the driving transistor T1*b*, and the voltage PVSS is provided to the light-emitting diode LED1. Thus, a voltage difference of the pixel circuit 100 can be established to enable driving current to flow from the terminal of the voltage PVDD to the terminal of the voltage PVSS, where the voltage PVDD is greater than the voltage PVSS.

The emission control line EAn provides an emission control signal EMAn having a first duty cycle to the emission control transistor T3*a*. The emission control line EBn provides an emission control signal EMBn having a second duty cycle to the emission control transistor T3*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a* and T3*b* according to emission control signals EMAn and EMBn respectively. In some other embodiments, only one of the emission control signals EMAn and EMBn turns on the emission control switch with specific duty cycle.

The switching transistor T2, the driving transistors T1*a* and T1*b* and the emission control transistors T3*a* and T3*b* can be p-type transistors. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

In the embodiments described above, two different types (dimensions or mobility characteristics) of the driving transistors T1*a* and T1*b* are selectively used for two display brightness modes respectively. A driving unit includes the driving transistors T1*a* and T1*b* and the emission control transistors T3*a* and T3*b* coupled respectively in series. The emission control transistors T3*a* and T3*b* are commonly coupled to the light emitting diode LED1. The control terminals of emission control transistors T3*a* and T3*b* are controlled independently by the emission control signals EMAn and EMBn respectively to select suitable driving current according to either the high brightness mode or the low brightness mode. It should be noted that the scan signal SCANn, and emission control signals EMAn and EMBn can be provided by the vertical driver 2. The data signal DATAm can be provided by the data driver 3.

When the switching transistor T2 turns on, the gate voltage Vg is set to the data voltage for a following display frame cycle such that the gate-source voltages (Vgs) of the driving transistor T1*a* and the driving transistor T1*b* are updated to generate the current for the following display frame cycle. At this time, if the emission control transistor T3*a* is turned on by the emission control signal EMAn, then a large current would flow through the light emitting diode LED1 for the high brightness mode. On the other hand, if the emission control transistor T3*b* is turned on by the emission control signal EMBn, then a small current would flow through the light emitting diode LED1 for the low brightness mode.

In some embodiments, more brightness modes can be created by adding more driving transistors and emission control transistors respectively constructed by the same principle to the pixel circuit. The disclosure is not limited thereto.

Figure 4A:
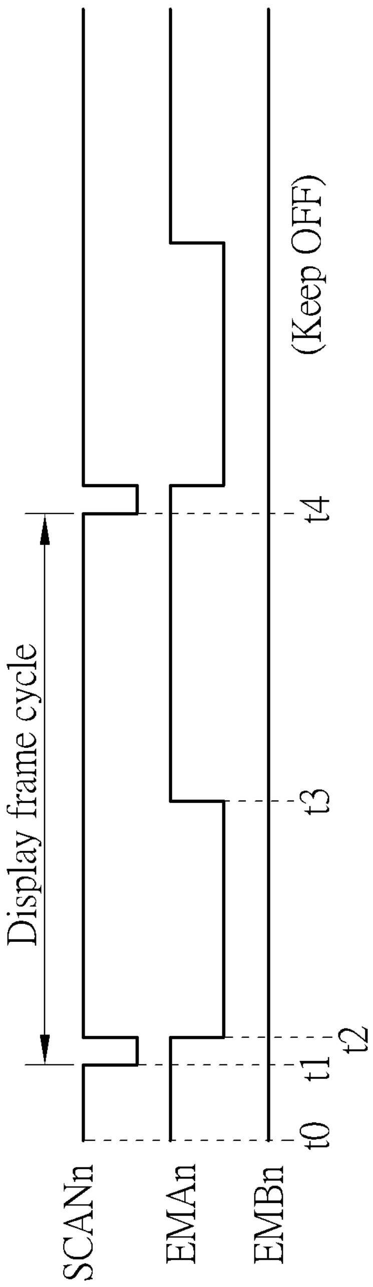
FIG. 4A illustrates a timing diagram of the operation signals of the pixel circuit of FIG. 3 of an embodiment according to the high brightness mode.
Figure 4B:
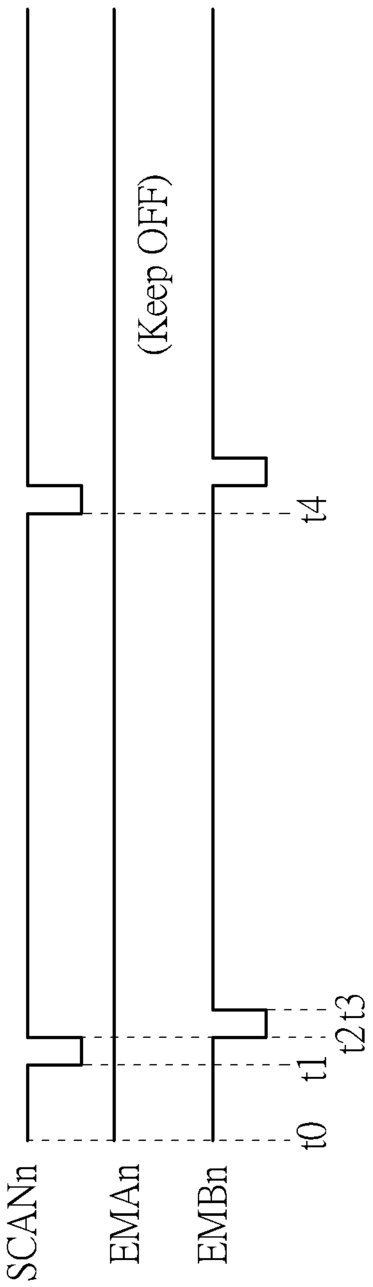
FIG. 4B illustrates a timing diagram of the operation signals of the pixel circuit of FIG. 3 of an embodiment according to the low brightness mode.

Please refer to both FIGS. 4A and 4B. FIG. 4A illustrates a timing diagram of the operation signals of the pixel circuit 100 of an embodiment according to the high brightness mode. Initially at time to, the scan signal SCANn, the emission control signals EMAn and EMBn are at high levels. Thus, the initial states of the driving transistors T1*a* and T1*b*, the switching transistor T2, and the emission control transistors T3*a* and T3*b* are turned off. A display frame cycle starts at time t1. Between time t1 to t2, a low pulse occurs in the scan signal SCANn, allowing the data signal DATAm to pass through the switching transistor T2 to control the driving transistors T1*a* and T1*b*. Between time t2 to t3, a low pulse occurs in the emission control signal EMAn to turn on the emission control transistor T3*a*. The emission control signal EMBn is maintained at the high level to keep the emission control transistor T3*b* turned off. Thus, during this time period, a large driving current can flow from the terminal of the voltage PVDD to the terminal of the voltage PVSS for a longer period to drive the light emitting diode LED1 for the high brightness mode display. At time t4, another display frame cycle begins. The behavior of the operation signals is similar for the various display frame cycles and the description is not repeated herein for brevity.

FIG. 4B illustrates a timing diagram of the operation signals of the pixel circuit 100 of an embodiment according to the low brightness mode. Initially at time to, the scan signal SCANn, the emission control signals EMAn and EMBn are at high levels. Thus, the initial states of the driving transistors T1*a* and T1*b*, the switching transistor T2, and the emission control transistors T3*a* and T3*b* are turned off. A display frame cycle starts at time t1. Between time t1 and t2, a low pulse occurs in the scan signal SCANn, allowing the data signal DATAm to pass through the switching transistor T2 to control the driving transistors T1*a* and T1*b*. Between time t2 and t3, a low pulse occurs in the emission control signal EMBn to turn on the emission control transistor T3*b*. The emission control signal EMAn is maintained at the high level to keep the emission control transistor T3*a* turned off. Thus, during this time period, a small driving current can flow from the terminal of the voltage PVDD to the terminal of the voltage PVSS for a shorter period to drive the light emitting diode LED1 for the low brightness mode display. At time t4, another display frame cycle begins. The behavior of the operation signals is similar for the various display frame cycles and the description is not repeated herein for brevity.

Figure 5:
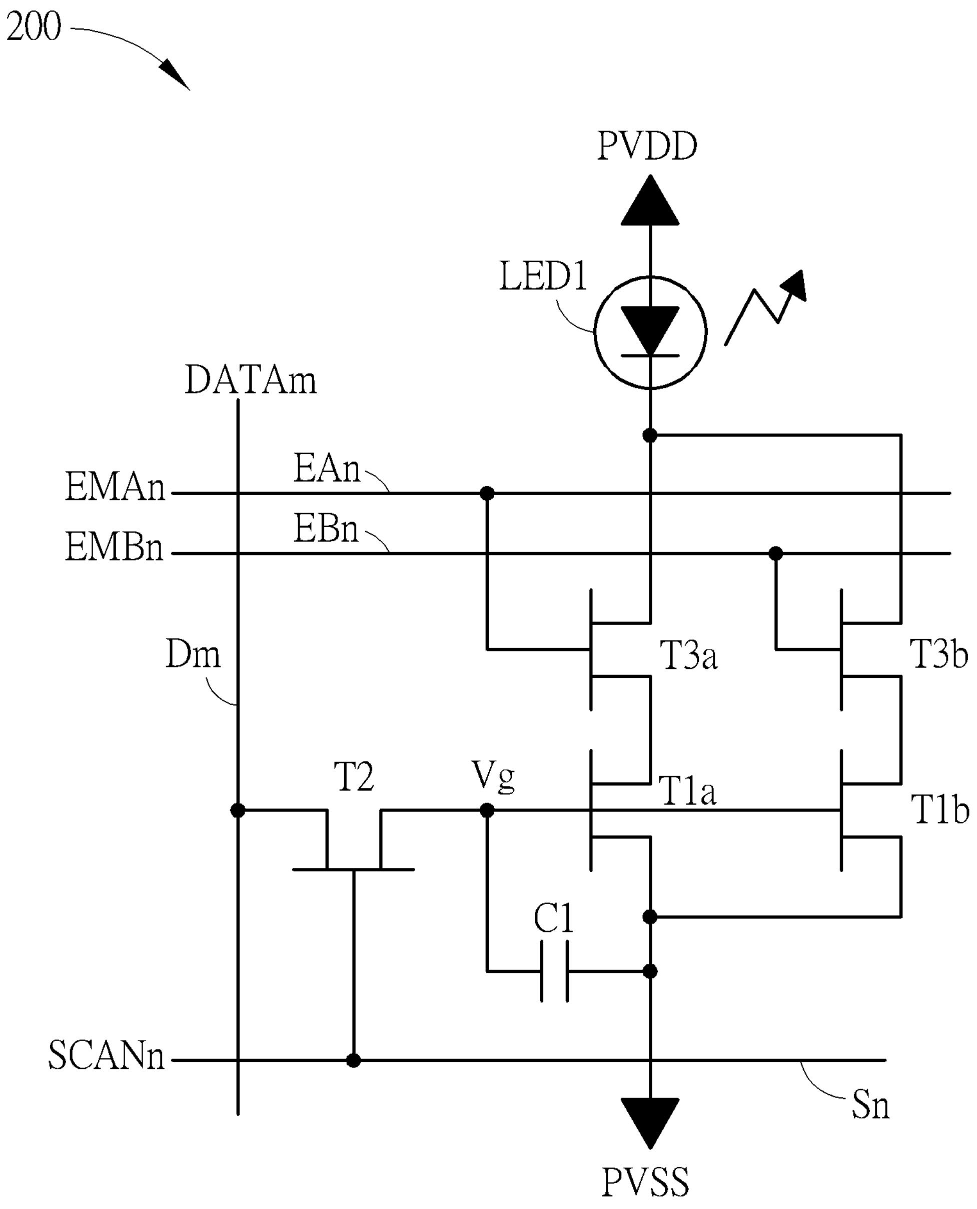
FIG. 5 illustrates a diagram of a pixel circuit of another embodiment.

FIG. 5 illustrates a diagram of a pixel circuit 200 of another embodiment. The pixel circuit 200 may be a pixel circuit Pnm in one of the pixels P11-PNM, with some variations. The pixel circuit 200 includes a switching transistor T2, a driving transistor T1*a*, a driving transistor T1*b*, an emission control transistor T3*a*, an emission control transistor T3*b*, a capacitor C1, and a light emitting diode LED1. The switching transistor T2, the driving transistors T1*a* and T1*b*, the emission control transistor T3*a* and T3*b* each include a first terminal, a second terminal and a control terminal. The control terminals of the driving transistor T1*a* and the driving transistor T1*b* are both coupled to the second terminal of the switching transistor T2. The first terminal of the driving transistor T1*a* can be coupled to the second terminal of the emission control transistor T3*a*. The first terminal of the driving transistor T1*b* can be coupled to the second terminal of the emission control transistor T3*b*. The light emitting diode LED1 can be coupled to the first terminal of the emission control transistor T3*a* and the first terminal of the emission control transistor T3*b*. The capacitor C1 can be coupled between the control terminal of the driving transistor T1*a* and the voltage source PVSS. The control terminal of the switching transistor T2 can be coupled to a scan line Sn. The first terminal of the switching transistor T2 can be coupled to a data line Dm. The control terminal of the emission control transistor T3*a* can be coupled to an emission control line EAn, and the control terminal of the emission control transistor T3*b* can be coupled to another emission control line EBn.

The scan line Sn provides a scan signal SCANn to the switching transistor T2 so that the data line Dm writes the data signal DATAm to the control terminals of the driving transistors T1*a* and T1*b*. The driving current is controlled by the driving transistors T1*a* and T1*b* according to the data signal DATAm input through the switching transistor T2. The voltage PVSS is provided to the first terminal of the driving transistor T1*a* and the first terminal of the driving transistor T1*b*, and the voltage PVDD is provided to the light-emitting diode LED1. Thus, a voltage difference of the pixel circuit 200 can be established to enable driving current to flow from the terminal of the voltage PVDD to the terminal of the voltage PVSS, where the voltage PVDD is greater than the voltage PVSS.

The emission control line EAn provides an emission control signal EMAn having a first duty cycle to the emission control transistor T3*a*. The emission control line EBn provides an emission control signal EMBn having a second duty cycle to the emission control transistor T3*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a* and T3*b* according to emission control signals EMAn and EMBn respectively.

The switching transistor T2, the driving transistors T1*a* and T1*b* and the emission control transistors T3*a* and T3*b* can be n-type transistors. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have a W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

In the embodiments described above, two different types (dimensions or mobility characteristics) of the driving transistors T1*a* and T1*b* are selectively used for two display brightness modes respectively. A driving unit includes the driving transistors T1*a* and T1*b* and the emission control transistors T3*a* and T3*b* coupled respectively in series. The emission control transistors T3*a* and T3*b* are commonly coupled to the light emitting diode LED1. The control terminals of emission control transistors T3*a* and T3*b* are controlled independently by the emission control signals EMAn and EMBn respectively to select suitable driving current according to either the high brightness mode or the low brightness mode. It should be noted that the scan signal SCANn, and the emission control signals EMAn and EMBn can be provided by the vertical driver 2. The data signal DATAm can be provided by the data driver 3.

When the switching transistor T2 turns on, the gate voltage Vg is set to the data voltage of a following display frame cycle such that the gate-source voltages (Vgs) of the driving transistor T1*a* and the driving transistor T1*b* are updated to generate the current for the following display frame cycle. At this time, if the emission control transistor T3*a* is turned on by the emission control signal EMAn, then a large current would flow through the light emitting diode LED for the high brightness mode. On the other hand, if the emission control transistor T3*b* is turned on by the emission control signal EMBn, then a small current would flow through the light emitting diode LED for the low brightness mode. The operation signals of the pixel circuit 200 are similar to those of the pixel circuit 100 thus the description is not be repeated herein for brevity.

In some embodiments, more brightness modes can be created by adding more driving transistors and emission control transistors respectively constructed by the same principle to the pixel circuit. The disclosure is not limited thereto.

Figure 6:
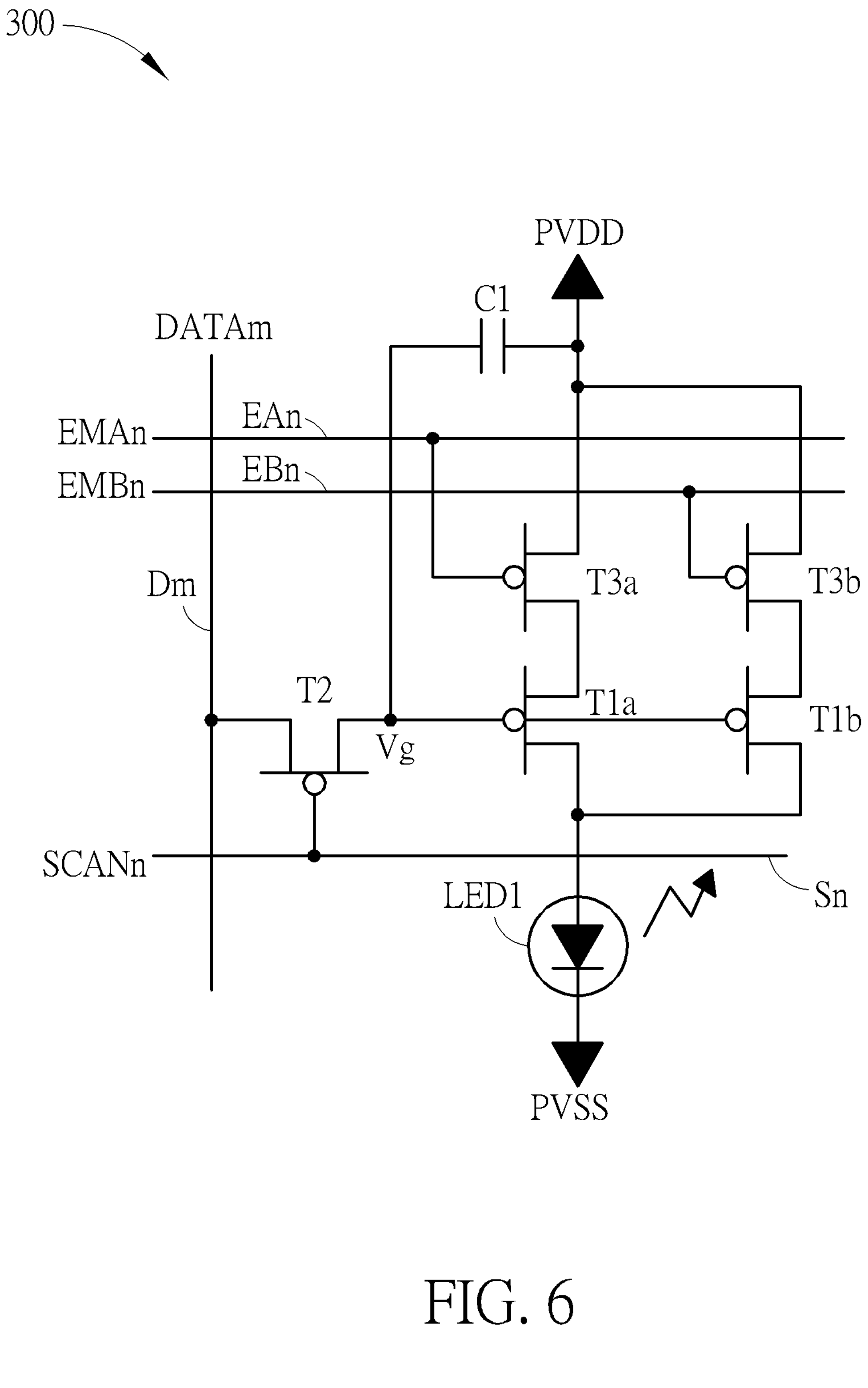
FIG. 6 illustrates a diagram of a pixel circuit of another embodiment.

FIG. 6 illustrates a diagram of a pixel circuit 300 of another embodiment. The pixel circuit 300 may be a pixel circuit Pnm (1≤m≤M, 1≤n≤N) in one of the pixels P11-PNM, with some variations. The pixel circuit 300 includes a switching transistor T2, a driving transistor T1*a*, a driving transistor T1*b*, an emission control transistor T3*a*, an emission control transistor T3*b*, a capacitor C1, and a light emitting diode LED1. The switching transistor T2, the driving transistors T1*a* and T1*b*, the emission control transistor T3*a* and T3*b* each include a first terminal, a second terminal and a control terminal. The control terminals of the driving transistor T1*a* and the driving transistor T1*b* are both coupled to the second terminal of the switching transistor T2. The second terminal of the emission control transistor T3*a* can be coupled to the first terminal of the driving transistor T1*a*. The second terminal of the emission control transistor T3*b* can be coupled to the first terminal of the driving transistor T1*b*. The light emitting diode LED1 can be coupled to the second terminal of the driving transistor T1*a* and the second terminal of the driving transistor T1*b*. The capacitor C1 can be coupled between the control terminal of the driving transistor T1*a* and the voltage source PVDD (i.e., a DC voltage). The control terminal of the switching transistor T2 can be coupled to a scan line Sn. The first terminal of the switching transistor T2 can be coupled to a data line Dm. The control terminal of the emission control transistor T3*a* can be coupled to an emission control line EAn, and the control terminal of the emission control transistor T3*b* can be coupled to another emission control line EBn.

The scan line Sn provides a scan signal SCANn to the switching transistor T2 to w so that the data line Dm writes the data signal DATAm to the control terminals of the driving transistors T1*a* and T1*b*. The driving current is controlled by the driving transistors T1*a* and T1*b* according to the data signal DATAm input through the switching transistor T2. The voltage PVDD is provided to the first terminal of the emission control transistor T3*a* and the first terminal of the emission control transistor T3*b*, and the voltage PVSS is provided to the light-emitting diode LED1. Thus, a voltage difference of the pixel circuit 300 can be established to enable driving current to flow from the terminal of the voltage PVDD to the terminal of the voltage PVSS, where the voltage PVDD is greater than the voltage PVSS.

The emission control line EAn provides an emission control signal EMAn having a first duty cycle to the emission control transistor T3*a*. The emission control line EBn provides an emission control signal EMBn having a second duty cycle to the emission control transistor T3*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a* and T3*b* according to emission control signals EMAn and EMBn respectively.

The switching transistor T2, the driving transistors T1*a* and T1*b* and the emission control transistors T3*a* and T3*b* can be p-type transistors. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

In the embodiments described above, two different types (dimensions or mobility characteristics) of the driving transistors T1*a* and T1*b* are selectively used for two display brightness modes respectively. A driving unit includes the driving transistors T1*a* and T1*b* and the emission control transistors T3*a* and T3*b* coupled respectively in series. The driving transistors T1*a* and T1*b* are commonly coupled to the light emitting diode LED1. The control terminals of emission control transistors T3*a* and T3*b* are controlled independently by the emission control signals EMAn and EMBn respectively to select suitable driving current according to either the high brightness mode or the low brightness mode. It should be noted that the scan signal SCANn, and emission control signals EMAn and EMBn can be provided by the vertical driver 2. The data signal DATAm can be provided by the data driver 3.

The operation signals of the pixel circuit 300 are similar to those of the pixel circuit 100, thus the description is not be repeated herein for brevity.

Figure 7:
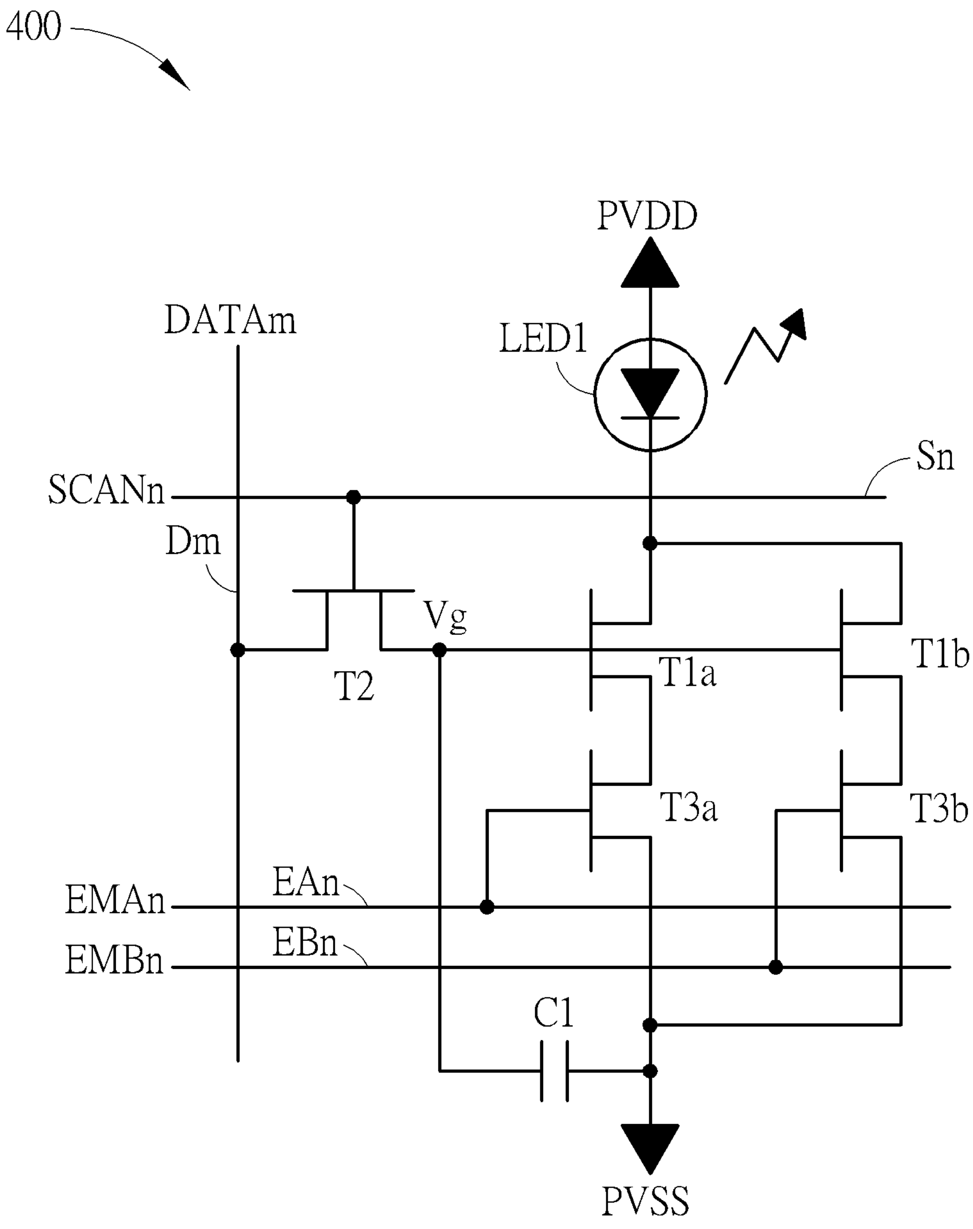
FIG. 7 illustrates a diagram of a pixel circuit of another embodiment.

FIG. 7 illustrates a diagram of a pixel circuit 400 of another embodiment. The pixel circuit 400 may be a pixel circuit Pnm (1≤m≤M, 1≤n≤N) in one of the pixels P11-PNM, with some variations. The pixel circuit 400 includes a switching transistor T2, a driving transistor T1*a*, a driving transistor T1*b*, an emission control transistor T3*a*, an emission control transistor T3*b*, a capacitor C1, and a light emitting diode LED1. The switching transistor T2, the driving transistors T1*a* and T1*b*, and the emission control transistor T3*a* and T3*b* each include a first terminal, a second terminal and a control terminal. The control terminals of the driving transistor T1*a* and the driving transistor T1*b* are both coupled to the second terminal of the switching transistor T2. The second terminal of the driving transistor T1*a* can be coupled to the first terminal of the emission control transistor T3*a*. The second terminal of the driving transistor T1*b* can be coupled to the first terminal of the emission control transistor T3*b*. The light emitting diode LED1 can be coupled to the first terminals of the driving transistors T1*a* and T1*b*. The capacitor C1 can be coupled between the control terminal of the driving transistor T1*a* and the voltage source PVSS. The control terminal of the switching transistor T2 can be coupled to a scan line Sn. The first terminal of the switching transistor T2 can be coupled to a data line Dm. The control terminal of the emission control transistor T3*a* can be coupled to an emission control line EAn, and the control terminal of the emission control transistor T3*b* can be coupled to another emission control line EBn.

The scan line Sn provides a scan signal SCANn to the switching transistor T2 so that the data line Dm writes the data signal DATAm to the control terminals of the driving transistors T1*a* and T1*b*. The driving current is controlled by the driving transistors T1*a* and T1*b* according to the data signal DATAm input through the switching transistor T2. The voltage PVSS is provided to the second terminal of the emission control transistor T3*a* and the second terminal of the emission control transistor T3*b*, and the voltage PVDD is provided to the light-emitting diode LED1. Thus, a voltage difference of the pixel circuit 400 can be established to enable driving current to flow from the terminal of the voltage PVDD to the terminal of the voltage PVSS, where the voltage PVDD is greater than the voltage PVSS.

The emission control line EAn provides an emission control signal EMAn having a first duty cycle to the emission control transistor T3*a*. The emission control line EBn provides an emission control signal EMBn having a second duty cycle to the emission control transistor T3*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a* and T3*b* according to the emission control signals EMAn and EMBn respectively.

The switching transistor T2, the driving transistors T1*a* and T1*b* and the emission control transistors T3*a* and T3*b* can be n-type transistors. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

In the embodiments described above, two different types (dimensions or mobility characteristics) of driving transistors T1*a* and T1*b* are selectively used for two display brightness modes respectively. A driving unit includes the driving transistors T1*a* and T1*b* and the emission control transistors T3*a* and T3*b* coupled respectively in series. The driving transistors T1*a* and T1*b* are commonly coupled to the light emitting diode LED1. The control terminals of emission control transistors T3*a* and T3*b* are controlled independently by the emission control signals EMAn and EMBn respectively to select suitable driving current according to either the high brightness mode or the low brightness mode. It should be noted that the scan signal SCANn, and the emission control signals EMAn and EMBn can be provided by the vertical driver 2. The data signal DATAm can be provided by the data driver 3.

The operation signals of the pixel circuit 400 are similar to those of the pixel circuit 100, thus the description is not be repeated herein for brevity.

Figure 8:
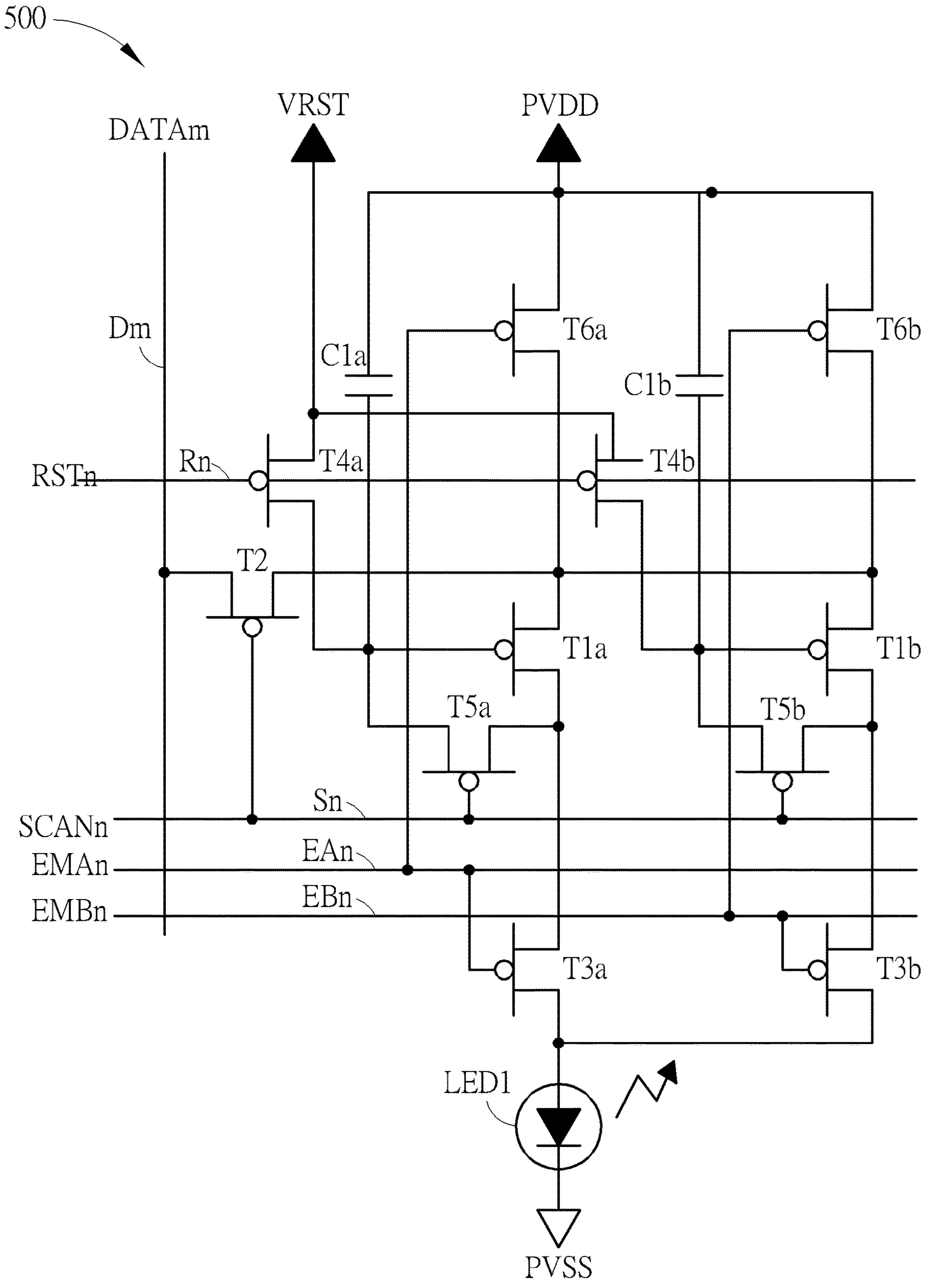
FIG. 8 illustrates a diagram of a pixel circuit of another embodiment.

FIG. 8 illustrates a diagram of a pixel circuit 500 of another embodiment. The pixel circuit 500 may be a pixel circuit Pnm (1≤m≤M, 1≤n≤N) in one of the pixels P11-PNM, with some variations. The pixel circuit 500 includes a switching transistor T2, driving transistors T1*a* and T1*b*, emission control transistors T3*a*, T3*b*, Toa and T6*b*, reset transistors T4*a* and T4*b*, compensation transistors T5*a* and T5*b*, capacitors C1*a* and C1*b*, and a light emitting diode LED1. The switching transistor T2, the driving transistors T1*a* and T1*b*, the emission control transistor T3*a*, T3*b*, T6*a* and T6*b*, and the reset transistors T4*a* and T4*b*, compensation transistors T5*a* and T5*b* each include a first terminal, a second terminal and a control terminal.

The control terminal of the driving transistor T1*a* can be coupled to the second terminal of the reset transistor T4*a*. The control terminal of the driving transistor T1*b* can be coupled to the second terminal of the reset transistor T4*b*. The second terminal of the driving transistor T1*a* can be coupled to the first terminal of the emission control transistor T3*a*. The second terminal of the driving transistor T1*b* can be coupled to the first terminal of the emission control transistor T3*b*. The light emitting diode LED1 can be coupled to the second terminal of the emission control transistor T3*a* and the second terminal of the emission control transistor T3*b*. The control terminals of the reset transistors T4*a* and T4*b* are both coupled to a reset line Rn. The control terminals of the compensation transistors T5*a* and T5*b* are both coupled to the scan line Sn. The capacitor C1*a* can be coupled between the control terminal of the driving transistor T1*a* and the voltage source PVDD. The capacitor C1*b* can be coupled between the control terminal of the driving transistor T1*b* and the voltage source PVDD. The second terminal of the compensation transistor T5*a* can be coupled to the control terminal of the driving transistor T1*a*, and the first terminal of the compensation transistor T5*a* can be coupled to the second terminal of the driving transistor T1*a*. The second terminal of the compensation transistor T5*b* can be coupled to the control terminal of the driving transistor T1*b*, and the first terminal of the compensation transistor T5*b* can be coupled to the second terminal of the driving transistor T1*b*. The control terminal of the switching transistor T2 can be coupled to a scan line Sn. The first terminal of the switching transistor T2 can be coupled to a data line Dm. The second terminal of the switching transistor T2 can be coupled to the first terminals of driving transistors T1*a* and T1*b*. The control terminals of the emission control transistor T3*a* and T6*a* can be coupled to an emission control line EAn, and the control terminals of the emission control transistor T3*b* and T6*b* can be coupled to another emission control line EBn. The second terminals of the emission control transistors Toa and T6*b* are coupled to the first terminals of the driving transistors T1*a* and T1*b* respectively.

The scan line Sn provides a scan signal SCANn to the switching transistor T2 and compensation transistors T5*a* and T5*b* so that the data line Dm writes the data signal DATAm to the control terminals of the driving transistors T1*a* and T1*b*. The driving current is controlled by the driving transistors T1*a* and T1*b* according to the data signal DATAm input through the switching transistor T2. The capacitors C1*a* and C1*b* can store the charges for turning on the driving transistors T1*a* and T1*b* respectively. The voltage PVDD is provided to the first terminal of the driving transistor Ta and the first terminal of the driving transistor T6*b*, and the voltage PVSS is provided to the light-emitting diode LED1. Thus, a voltage difference of the pixel circuit 500 can be established to enable driving current to flow from the terminal of the voltage PVDD to the terminal of the voltage PVSS, where the voltage PVDD is greater than the voltage PVSS.

The reset line Rn provides a reset signal RSTn to the reset transistors T4*a* and T4*b*. A voltage VRST is provided to the first terminals of the reset transistors T4*a* and T4*b*. They function to set the driving transistors T1*a* and T1*b* to receive the data signal DATAm for a following display frame cycle.

The emission control line EAn provides an emission control signal EMAn having a first duty cycle to the emission control transistors T3*a* and T6*a*. The emission control line EBn provides an emission control signal EMBn having a second duty cycle to the emission control transistors T3*b* and T6*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a*, Toa and T3*b*, T6*b* according to the emission control signals EMAn and EMBn respectively.

The switching transistor T2, the driving transistors T1*a* and T1*b*, the emission control transistor T3*a*, T3*b*, Toa and T6*b*, the reset transistors T4*a* and T4*b*, compensation transistors T5*a* and T5*b*, can be p-type transistors. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

Figure 9A:
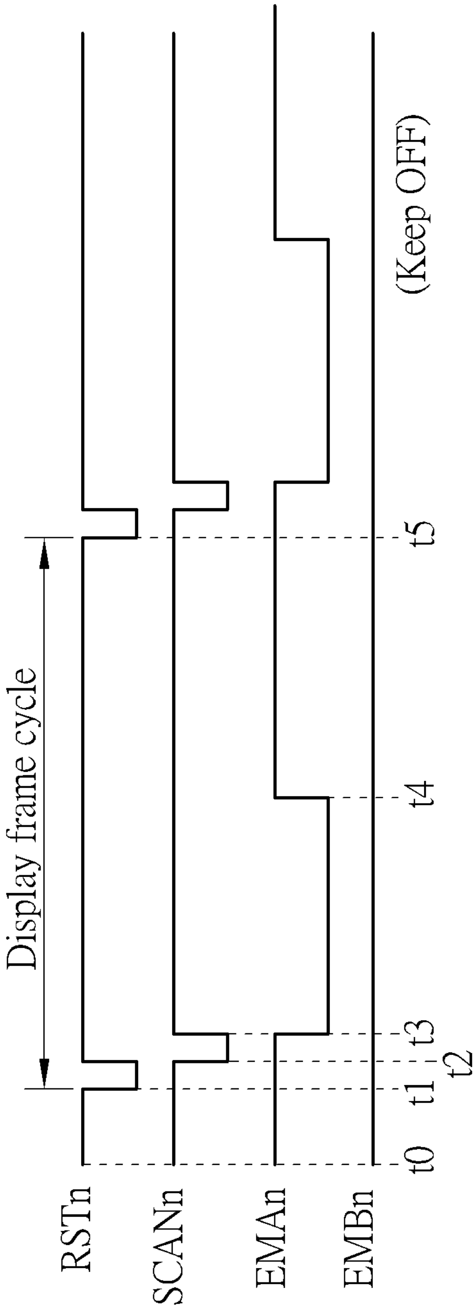
FIG. 9A illustrates a timing diagram of the operation signals of the pixel circuit of FIG. 8 of an embodiment according to the high brightness mode.
Figure 9B:
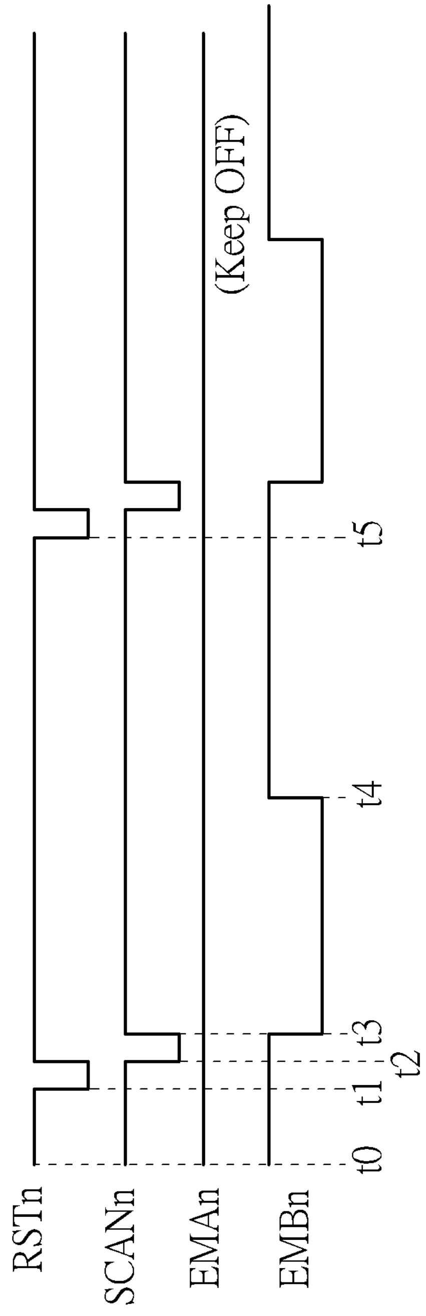
FIG. 9B illustrates a timing diagram of the operation signals of the pixel circuit of FIG. 8 of an embodiment according to the low brightness mode.

Please refer to both FIGS. 9A and 9B. FIG. 9A illustrates a timing diagram of the operation signals of the pixel circuit 500 of an embodiment according to the high brightness mode. Initially at time to, the reset signal RSTn, the scan signal SCANn, the emission control signals EMAn and EMBn are at high levels. Thus, the initial states of the switching transistor T2, the emission control transistors T3*a*, T3*b*, Toa and T6*b*, and the reset transistors T4*a* and T4*b*, compensation transistors T5*a* and T5*b* are turned off. Between time t1 and t2, a low pulse occurs in the reset signal RSTn to turn on the reset transistors T4*a* and T4*b* allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn, allowing the data signal DATAm to pass through the switching transistor T2 to the respective first terminals of the driving transistors T1*a* and T1*b*. While the compensation transistors T5*a* and T5*b* are turned on, the data signal DATAm can be transferred through the respective compensation transistors T5*a* and T5*b* to the respective control terminals of the driving transistors T1*a* and T1*b*, thus the control voltage of the driving transistors T1*a* and T1*b* are determined. Between time t3 and t4, a low pulse occurs in the emission control signal EMAn to turn on the emission control transistors T3*a* and T6*a*. The emission control signal EMBn is maintained at the high level to keep the emission control transistors T3*b* and T6*b* turned off. Thus, during this time period, a large driving current can flow from the terminal of the voltage PVDD to the terminal of the voltage PVSS to drive the light emitting diode LED1 for the high brightness mode display. At time t5, another display frame cycle begins. The behavior of the operation signals is similar for the various display frame cycles and the description is not repeated herein for brevity.

FIG. 9B illustrates a timing diagram of the operation signals of the pixel circuit 500 of an embodiment according to the low brightness mode. Initially at time to, the reset signal RSTn, the scan signal SCANn, the emission control signals EMAn and EMBn are at high levels. Thus, the initial states of the switching transistor T2, the emission control transistors T3*a*, T3*b*, Toa and T6*b*, and the reset transistors T4*a* and T4*b*, compensation transistors T5*a* and T5*b* are turned off. Between time t1 and t2, a low pulse occurs in the reset signal RSTn to turn on the reset transistors T4*a* and T4*b* allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn, allowing the data signal DATAm to pass through the switching transistor T2 to the respective first terminals of the driving transistors T1*a* and T1*b*. While the compensation transistors T5*a* and T5*b* are turned on, the data signal DATAm can be transferred through e respective compensation transistors T5*a* and T5*b* to the respective control terminals of the driving transistors T1*a* and T1*b*, thus the control voltage of the driving transistors T1*a* and T1*b* are determined. Between time t3 and t4, a low pulse occurs in the emission control signal EMBn to turn on the emission control transistors T3*b* and T6*b*. The emission control signal EMAn is maintained at the high level to keep the emission control transistors T3*a* and T6*a* turned off. Thus, during this time period, a small driving current can flow from the terminal of the voltage PVDD to the terminal of the voltage PVSS to drive the light emitting diode LED1 for the low brightness mode display. At time t5, another display frame cycle begins. The behavior of the operation signals is similar for the various display frame cycles and the description is not repeated herein for brevity.

Figure 10:
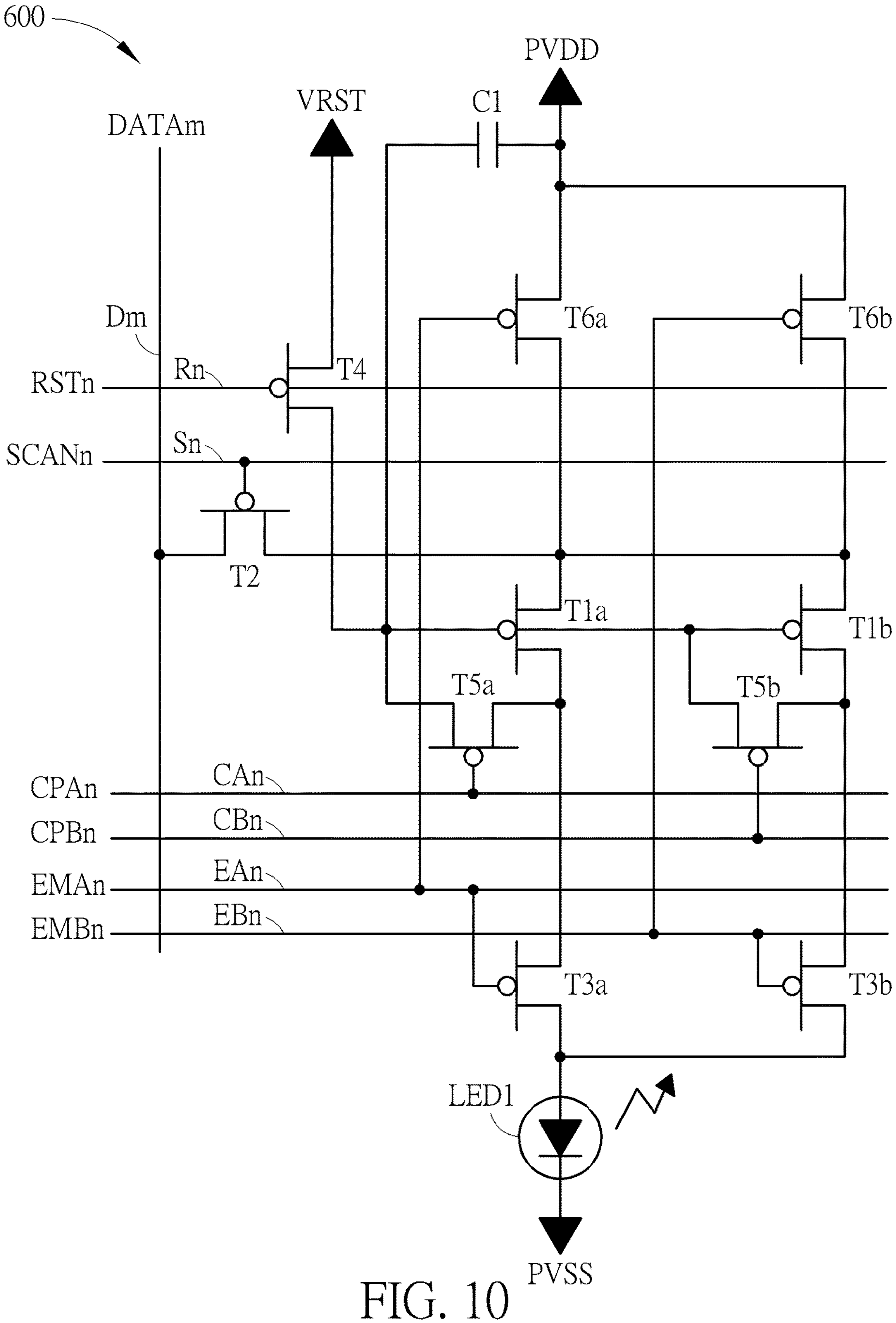
FIG. 10 illustrates a diagram of a pixel circuit of another embodiment.

FIG. 10 illustrates a diagram of a pixel circuit 600 of another embodiment. The pixel circuit 600 may be a pixel circuit Pnm (1≤m≤M, 1≤n≤N) in one of the pixels P11-PNM, with some variations. The pixel circuit 600 includes a switching transistor T2, driving transistors T1*a* and T1*b*, emission control transistors T3*a*, T3*b*, T6*a* and T6*b*, reset transistor T4, compensation transistors T5*a* and T5*b*, capacitors C1, and a light emitting diode LED1. The switching transistor T2, the driving transistors T1*a* and T1*b*, the emission control transistor T3*a*, T3*b*, Toa and T6*b*, the reset transistors T4, and the compensation transistors T5*a* and T5*b* each include a first terminal, a second terminal and a control terminal.

The control terminal of the driving transistor T1*a* can be coupled to the second terminal of the reset transistor T4. The control terminal of the driving transistor T1*b* can be coupled to the second terminal of the reset transistor T4. The first terminal of the emission control transistor T3*a* can be coupled to the second terminal of the driving transistor T1*a*. The first terminal of the emission control transistor T3*b* can be coupled to the second terminal of the driving transistor T1*b*. The light emitting diode LED1 can be coupled to the second terminal of the emission control transistors T3*a* and the second terminal of the emission control transistor T3*b*. The control terminal of the reset transistor T4 can be coupled to a reset line Rn. The control terminal of the compensation transistor T5*a* can be coupled to a compensation line CAn, and the control terminal of the compensation transistor T5*b* can be coupled to another compensation line CBn. The capacitor C1 can be coupled between the control terminal of the driving transistor T1*a* and the voltage source PVDD. The second terminal of the compensation transistor T5*a* can be coupled to the control terminal of the driving transistor T1*a*, and the first terminal of the compensation transistor Ta can be coupled to the second terminal of the driving transistor T1*a*. The second terminal of the compensation transistor T5*b* can be coupled to the control terminal of the driving transistor T1*b*, and the second terminal of the compensation transistor T5*b* can be coupled to the second terminal of the driving transistor T1*b*. The control terminal of the switching transistor T2 can be coupled to a scan line Sn. The first terminal of the switching transistor T2 can be coupled to a data line Dm. The second terminal of the switching transistor T2 can be coupled to the first terminals of driving transistors T1*a* and T1*b*. The control terminals of the emission control transistors T3*a* and T6*a* can be coupled to an emission control line EAn, and the control terminals of the emission control transistors T3*b* and T6*b* can be coupled to another emission control line EBn. The second terminals of the emission control transistors Ta and T6*b* are coupled to the first terminals of the driving transistors T1*a* and T1*b* respectively.

The scan line Sn provides a scan signal SCANn to the switching transistor T2 and compensation transistors T5*a* and T5*b* so that the data line Dm writes the data signal DATAm to the control terminals of the driving transistors T1*a* and T1*b*. The driving current is controlled by the driving transistors T1*a* and T1*b* according to the data signal DATAm input through the switching transistor T2. The voltage PVDD is provided to the first terminal of the driving transistor T6*a* and the first terminal of the driving transistor T6*b*, and the voltage PVSS is provided to the light-emitting diode LED1. Thus, a voltage difference of the pixel circuit 600 can be established to enable driving current to flow from the terminal of the voltage PVDD to the terminal of the voltage PVSS, where the voltage PVDD is greater than the voltage PVSS.

The reset line Rn provides a reset signal RSTn to the reset transistor T4. A voltage VRST is provided to the first terminal of the reset transistor T4. The reset transistor T4 functions to set the driving transistors T1*a* and T1*b* to receive the data signal DATAm for a following display frame cycle. The compensation lines CAn and CBn provide respectively the compensation signals CPAn and CPBn to independently control the compensation transistors T5*a* and T5*b*.

The emission control line EAn provides an emission control signal EMAn having a first duty cycle to the emission control transistors T3*a* and T6*a*. The emission control line EBn provides an emission control signal EMBn having a second duty cycle to the emission control transistors T3*b* and T6*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a*, T6*a* and T3*b*, T6*b* according to the emission control signals EMAn and EMBn respectively. It should be noted that the scan signal SCANn, the compensation signals CPAn and CPBn, and the emission control signals EMAn and EMBn can be provided by the vertical driver 2. The data signal DATAm can be provided by the data driver 3.

The switching transistor T2, the driving transistors T1*a* and T1*b*, the emission control transistor T3*a*, T3*b*, Toa and T6*b*, the reset transistor T4, compensation transistors T5*a* and T5*b*, can be p-type transistors. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

Figure 11A:
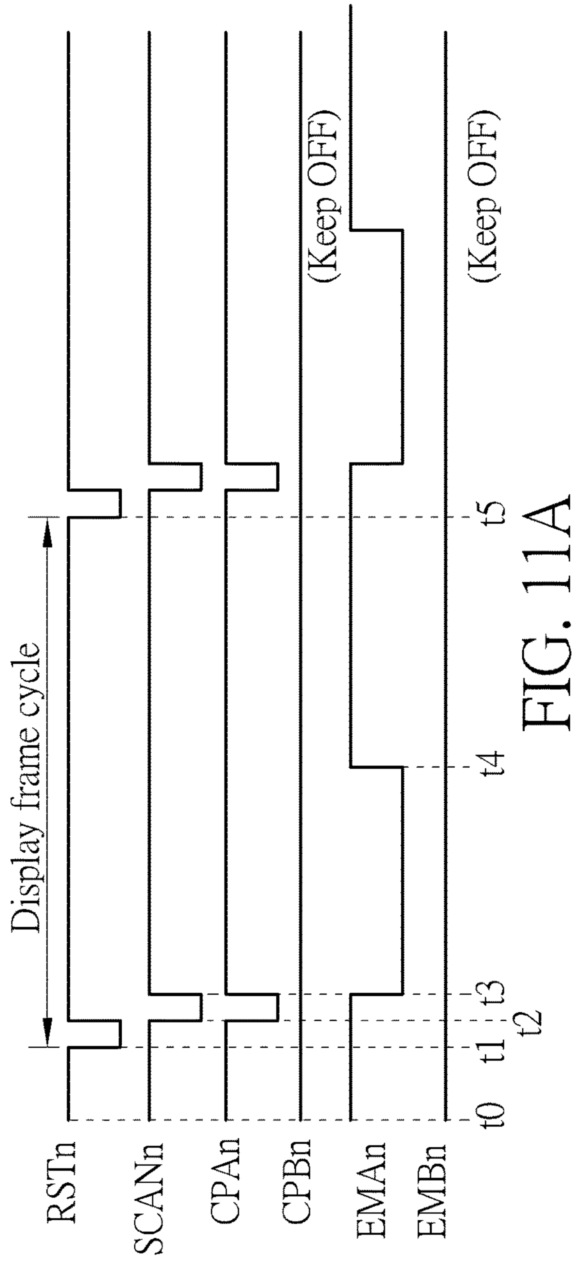
FIG. 11A illustrates a timing diagram of the operation signals of the pixel circuit of FIG. 10 of an embodiment according to the high brightness mode.
Figure 11B:
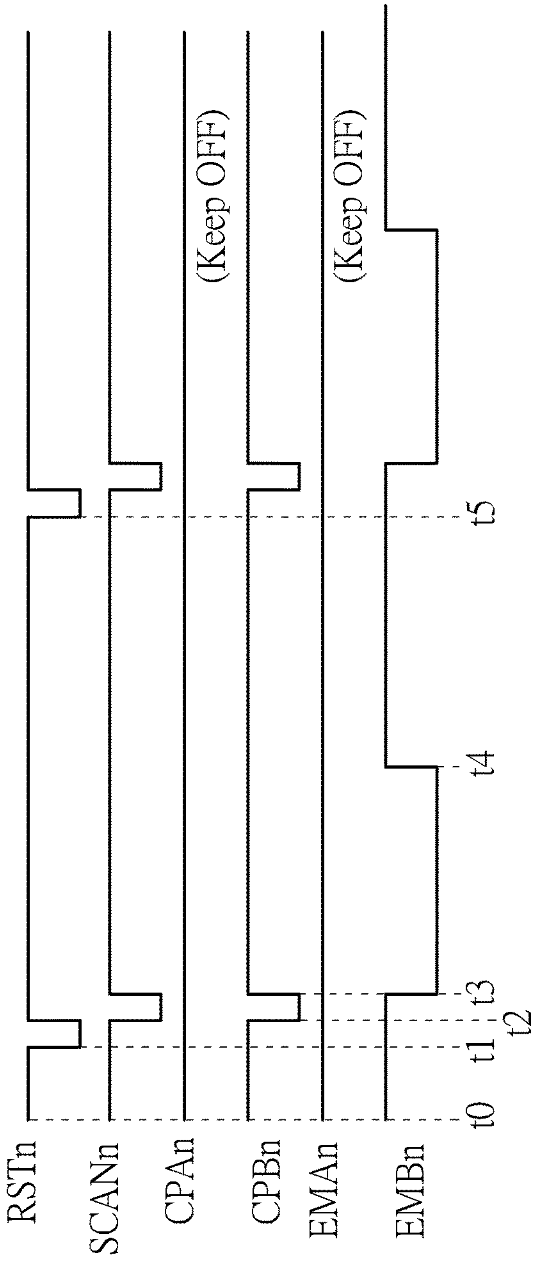
FIG. 11B illustrates a timing diagram of the operation signals of the pixel circuit of FIG. 10 of an embodiment according to the low brightness mode.

Please refer to both FIGS. 11A and 11B. FIG. 11A illustrates a timing diagram of the operation signals of the pixel circuit 600 of an embodiment according to the high brightness mode. Initially at time to, the reset signal RSTn, the scan signal SCANn, the emission control signals EMAn and EMBn, the compensation signals CPAn and CPBn are at high levels. Thus, the initial states of the switching transistor T2, the emission control transistors T3*a*, T3*b*, T6*a* and T6*b*, and the reset transistor T4, compensation transistors T5*a* and T5*b* are turned off. Between time t1 and t2, a low pulse occurs in the reset signal RSTn to turn on the reset transistors T4 allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn, allowing the data signal DATAm to pass through the switching transistor T2 to the respective first terminals of the driving transistors T1*a* and T1*b*. At the same time, a low pulse occurs in the compensation signal CPAn to turn on the compensation transistor T5*a*. While the compensation transistor T5*a* is turned on, the data signal DATAm can be transferred through the compensation transistor T5*a* to the control terminal of the driving transistors T1*a*, thus the control voltage of the driving transistor T1*a* is determined. The compensation signal CPBn is maintained at the high level. Between time t3 and t4, a low pulse occurs in the emission control signal EMAn to turn on the emission control transistors T3*a* and T6*a*. The emission control signal EMBn is maintained at the high level to keep the emission control transistors T3*b* and T6*b* turned off. Thus, during this time period, a large driving current can flow from the terminal of the voltage PVDD to the terminal of the voltage PVSS to drive the light emitting diode LED1 for the high brightness mode display. At time t5, another display frame cycle begins. The behavior of the operation signals is similar for the various display frame cycles and the description is not repeated herein for brevity.

FIG. 11B illustrates a timing diagram of the operation signals of the pixel circuit 600 of an embodiment according to the low brightness mode. Initially at time to, the reset signal RSTn, the scan signal SCANn, the emission control signals EMAn and EMBn, the compensation signals CPAn and CPBn are at high levels. Thus, the initial states of the switching transistor T2, the emission control transistors T3*a*, T3*b*, Toa and T6*b*, and the reset transistor T4, compensation transistors T5*a* and T5*b* are turned off. Between time t1 and t2, a low pulse occurs in the reset signal RSTn to turn on the reset transistor T4 allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn, allowing the data signal DATAm to pass through the switching transistor T2 to the respective first terminals of the driving transistors T1*a* and T1*b*. At the same time, a low pulse occurs in the compensation signal CPBn to turn on the compensation transistor T5*b*. While the compensation transistor T5*b* is turned on, the data signal DATAm can be transferred through the compensation transistor T5*b* to the control terminal of the driving transistors T1*b*, thus the control voltage of the driving transistor T1*b* is determined. The compensation signal CPAn is maintained at the high level. Between time t3 and t4, a low pulse occurs in the emission control signal EMBn to turn on the emission control transistors T3*b* and T6*b*. The emission control signal EMAn is maintained at the high level to keep the emission control transistors T3*a* and T6*a* turned off. Thus, during this time period, a small driving current can flow from the terminal of the voltage PVDD to the terminal of the voltage PVSS to drive the light emitting diode LED1 for the low brightness mode display. At time t5, another display frame cycle begins. The behavior of the operation signals is similar for the various display frame cycles and the description is not repeated herein for brevity.

Figure 12:
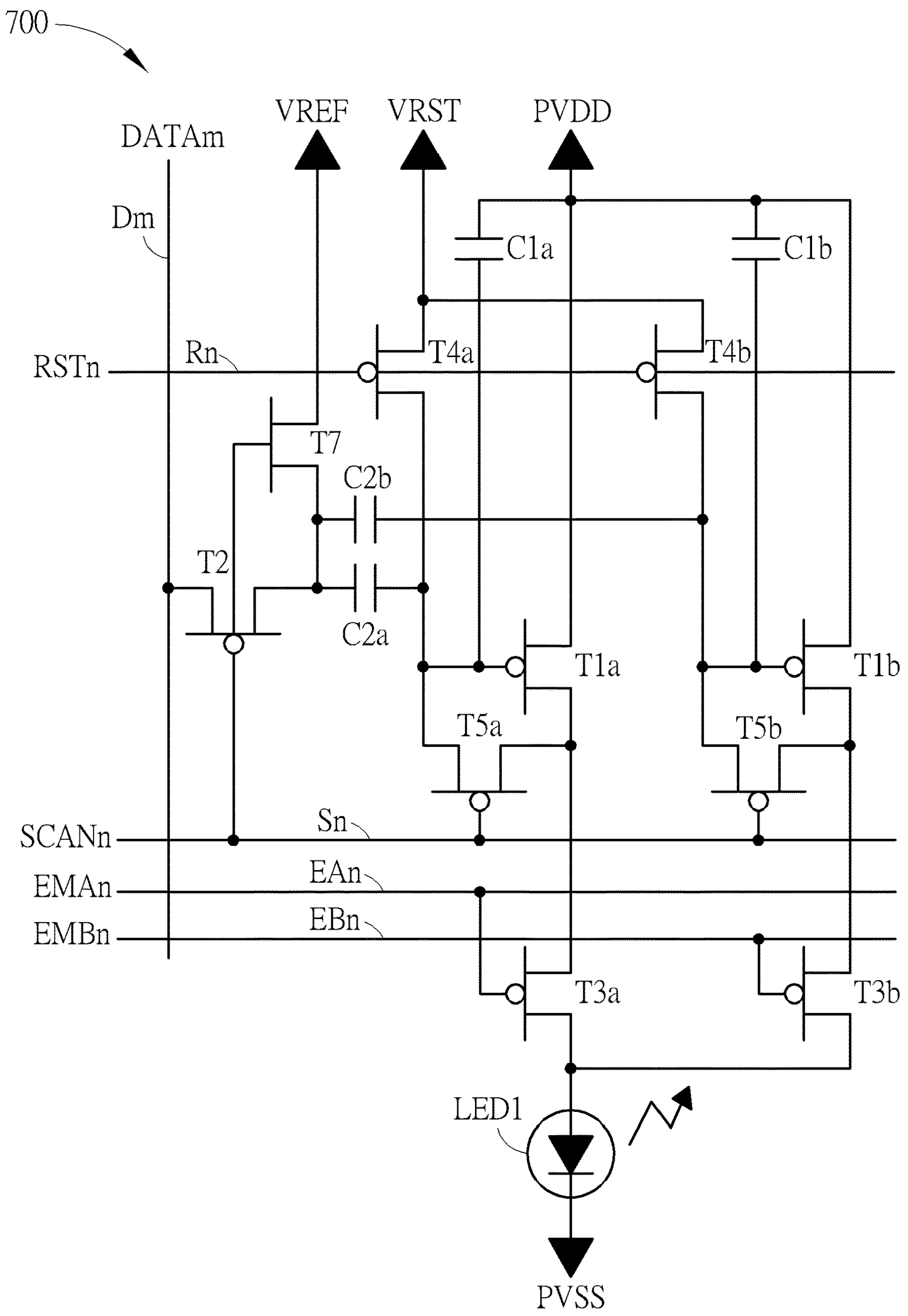
FIG. 12 illustrates a diagram of a pixel circuit of another embodiment.

FIG. 12 illustrates a diagram of a pixel circuit 700 of another embodiment. The pixel circuit 700 may be a pixel circuit Pnm (1≤m≤M, 1≤n≤N) in one of the pixels P11-PNM, with some variations. The pixel circuit 700 includes a switching transistor T2, driving transistors T1*a* and T1*b*, emission control transistors T3*a* and T3*b*, reset transistors T4*a* and T4*b*, compensation transistors T5*a* and T5*b*, reference control transistor T7, capacitors C1*a*, C1*b*, C2*a* and C2*b*, and a light emitting diode LED1. The switching transistor T2, the driving transistors T1*a* and T1*b*, the emission control transistor T3*a* and T3*b*, the reset transistors T4*a* and T4*b*, compensation transistors T5*a* and T5*b*, and the reference control transistor T7 each include a first terminal, a second terminal and a control terminal.

The control terminal of the driving transistor T1*a* can be coupled to the second terminal of the reset transistor T4*a*. The control terminal of the driving transistor T1*b* can be coupled to the second terminal of the reset transistor T4*b*. The second terminal of the driving transistor T1*a* can be coupled to the first terminal of the emission control transistor T3*a*. The second terminal of the driving transistor T1*b* can be coupled to the first terminal of the emission control transistor T3*b*. The light emitting diode LED1 can be coupled to the second terminal of the emission control transistor T3*a* and the second terminal of the emission control transistor T3*b*. The control terminals of the reset transistors T4*a* and T4*b* are both coupled to a reset line Rn. The control terminals of the compensation transistors T5*a* and T5*b* are both coupled to the scan line Sn. The capacitor C1*a* can be coupled between the control terminal of the driving transistor T1*a* and the voltage source PVDD. The capacitor C1*b* can be coupled between the control terminal of the driving transistor T1*b* and the voltage source PVDD. The capacitor C2*a* can be coupled between the second terminal of the switching transistor T2 and the control terminal of the driving transistor T1*a*. The capacitor C2*b* can be coupled between the second terminal of the switching transistor T2 and the control terminal of the driving transistor T1*b*. The second terminal of the compensation transistor T5*a* can be coupled to the control terminal of the driving transistor T1*a*, and the first terminal of the compensation transistor T5*a* can be coupled to the second terminal of the driving transistor T1*a*. The second terminal of the compensation transistor T5*b* can be coupled to the control terminal of the driving transistor T1*b*, and the first terminal of the compensation transistor T5*b* can be coupled to the second terminal of the driving transistor T1*b*. The control terminal of the switching transistor T2 can be coupled to a scan line Sn. The first terminal of the switching transistor T2 can be coupled to a data line Dm. The control terminal of the emission control transistor T3*a* can be coupled to an emission control line EAn, and the control terminal of the emission control transistor T3*b* can be coupled to another emission control line EBn. The control terminal of the reference control transistor T7 can be coupled to the scan line Sn. The second terminal of the reference control transistor T7 can be coupled to the second terminal of the switching transistor T2.

The scan line Sn provides a scan signal SCANn to the switching transistor T2, compensation transistors T5*a* and T5*b* and the reference control transistor T7 so that the data line Dm writes the data signal DATAm to the control terminals of the driving transistors T1*a* and T1*b*. The voltage VREF is provided to the first terminal the reference control transistor T7 to provide a coupling voltage for the capacitors C2*a* and C2*b*. The driving current is controlled by the driving transistors T1*a* and T1*b* according to the data signal DATAm with capacitive coupling of the capacitor C2*a* and C2*b* respectively. The capacitors C2*a* and C2*b* can be used to drive the driving transistors T1*a* and T1*b* respectively. With a higher level of the data signal DATAm, a higher driving current through the driving transistor T1*a* or T1*b* can be produced. The voltage PVDD is provided to the first terminal of the driving transistor T1*a* and the first terminal of the driving transistor T1*b*, and the voltage PVSS is provided to the light-emitting diode LED1. Thus, a voltage difference of the pixel circuit 700 can be established to enable driving current to flow from the terminal of the voltage PVDD to the terminal of the voltage PVSS, where the voltage PVDD is greater than the voltage PVSS.

The reset line Rn provides a reset signal RSTn to the reset transistors T4*a* and T4*b*. A voltage VRST is provided to the first terminals of the reset transistors T4*a* and T4*b*. They function to set the driving transistors T1*a* and T1*b* to receive the data signal DATAm for a following display frame cycle.

The emission control line EAn provides an emission control signal EMAn having a first duty cycle to the emission control transistor T3*a*. The emission control line EBn provides an emission control signal EMBn having a second duty cycle to the emission control transistor T3*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a* and T3*b* according to the emission control signals EMAn and EMBn respectively.

The switching transistor T2, the driving transistors T1*a* and T1*b*, the emission control transistor T3*a* and T3*b*, and the reset transistors T4*a* and T4*b*, compensation transistors T5*a* and T5*b*, can be p-type transistors. The reference control transistor T7 can be an n-type transistor. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

Figure 13A:
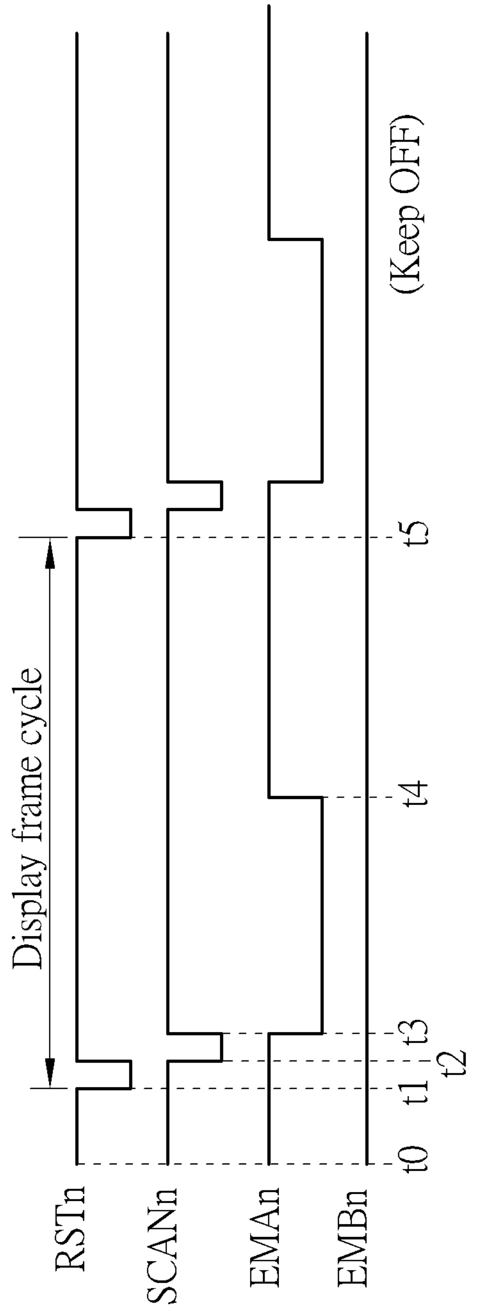
FIG. 13A illustrates a timing diagram of the operation signals of the pixel circuit of FIG. 12 of an embodiment according to the high brightness mode.
Figure 13B:
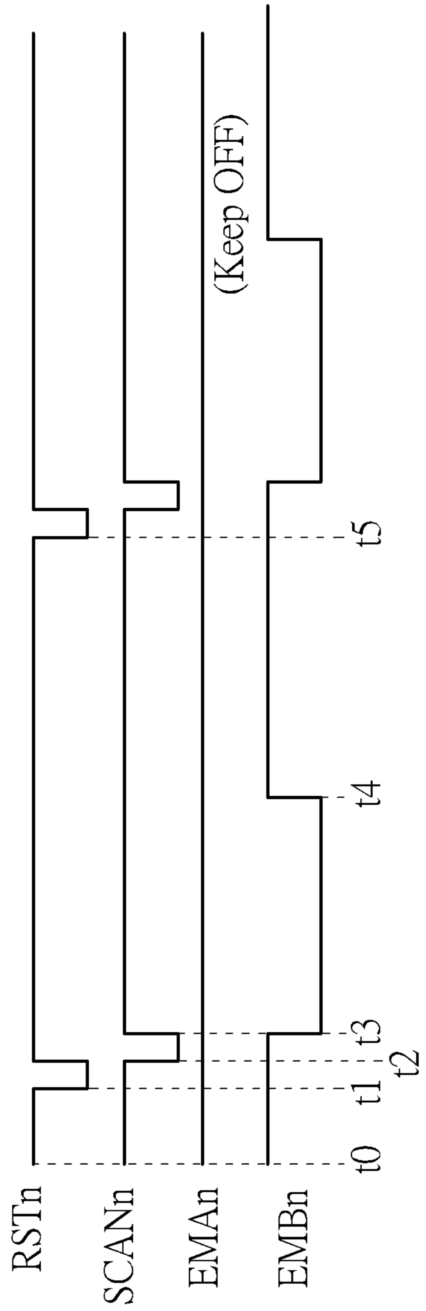
FIG. 13B illustrates a timing diagram of the operation signals of the pixel circuit of FIG. 12 of an embodiment according to the low brightness mode.

Please refer to both FIGS. 13A and 13B. FIG. 13A illustrates a timing diagram of the operation signals of the pixel circuit 700 of an embodiment according to the high brightness mode. Initially at time to, the reset signal RSTn, the scan signal SCANn, the emission control signals EMAn and EMBn are at high levels. Thus, the initial states of the switching transistor T2, the emission control transistors T3*a* and T3*b*, and the reset transistors T4*a* and T4*b*, compensation transistors T5*a* and T5*b*, and the reference control transistor T7 are turned off. Between time t1 and t2, a low pulse occurs in the reset signal RSTn to turn on the reset transistors T4*a* and T4*b* allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn to turn on the switching transistor T2, the reference transistor T7 and the compensation transistors T5*a* and T5*b*, allowing the data signal DATAm to pass through the switching transistor T2 and coupled to the respective capacitors C2*a* and C2*b*, thus controlling the driving transistors T1*a* and T1*b*. Between time t3 and t4, a low pulse occurs in the emission control signal EMAn to turn on the emission control transistors T3*a*. The emission control signal EMBn is maintained at the high level to keep the emission control transistor T3*b* turned off. Thus, during this time period, a large driving current can flow from the terminal of the voltage PVDD to the terminal of the voltage PVSS to drive the light emitting diode LED1 for the high brightness mode display. At time t5, another display frame cycle begins. The behavior of the operation signals is similar for the various display frame cycles and the description is not repeated herein for brevity.

FIG. 13B illustrates a timing diagram of the operation signals of the pixel circuit 700 of an embodiment according to the low brightness mode. Initially at time to, the reset signal RSTn, the scan signal SCANn, the emission control signals EMAn and EMBn are at high levels. Thus, the initial states of the switching transistor T2, the emission control transistors T3*a* and T3*b*, and the reset transistors T4*a* and T4*b*, compensation transistors T5*a* and T5*b*, and the reference control transistor T7 are turned off. Between time t1 and t2, a low pulse occurs in the reset signal RSTn to turn on the reset transistors T4*a* and T4*b* allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn to turn on the switching transistor T2, the reference transistor T7 and the compensation transistor T5*a* and T5*b*, allowing the data signal DATAm to pass through the switching transistor T2 and coupled to the respective capacitors C2*a* and C2*b*, thus controlling the driving transistors T1*a* and T1*b*. Between time t3 and t4, a low pulse occurs in the emission control signal EMBn to turn on the emission control transistors T3*b*. The emission control signal EMAn is maintained at the high level to keep the emission control transistor T3*a* turned off. Thus, during this time period, a small driving current can flow from the terminal of the voltage PVDD to the terminal of the voltage PVSS to drive the light emitting diode LED1 for the low brightness mode display. At time t5, another display frame cycle begins. The behavior of the operation signals is similar for the various display frame cycles and the description is not repeated herein for brevity.

Figure 14:
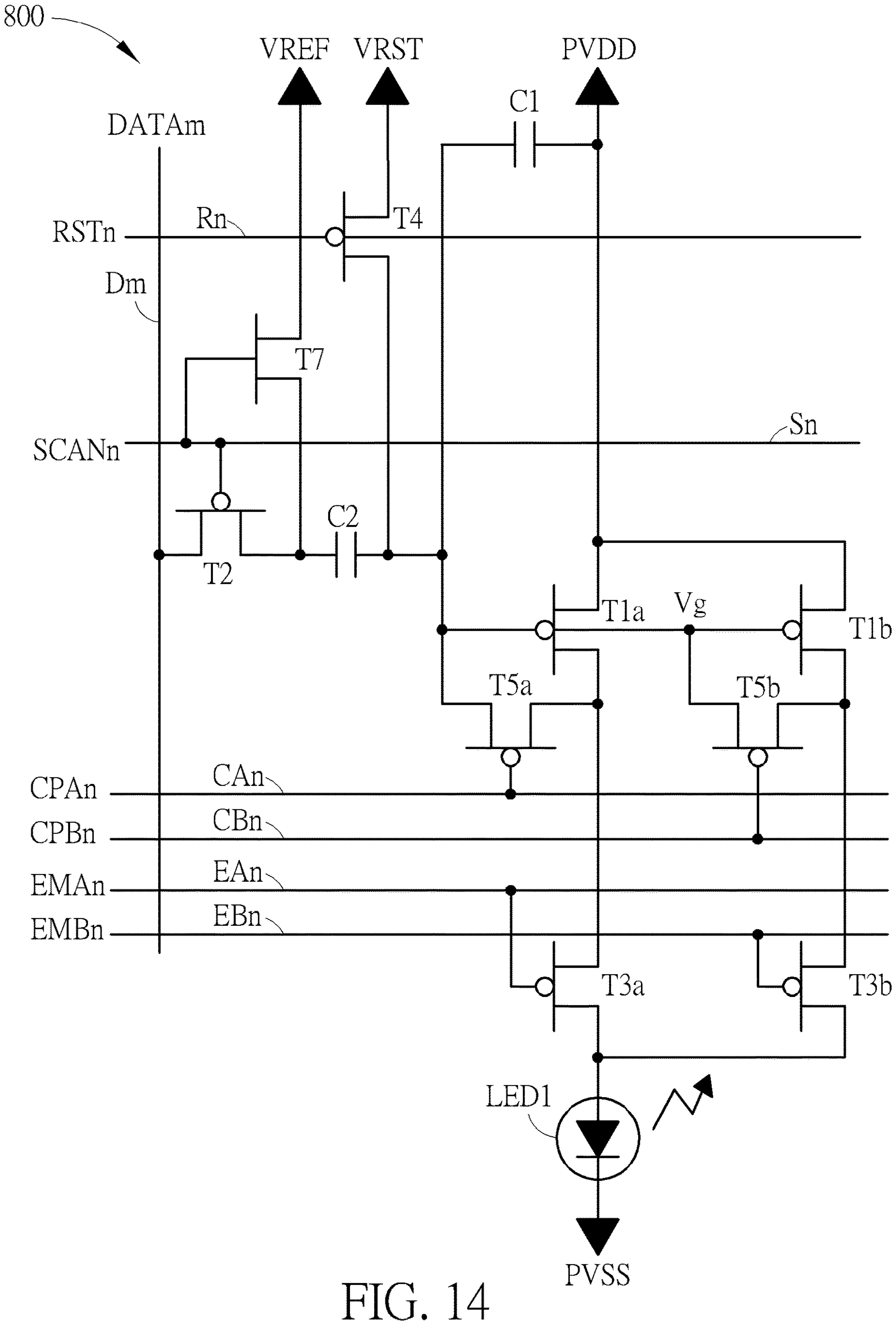
FIG. 14 illustrates a diagram of a pixel circuit of another embodiment.

FIG. 14 illustrates a diagram of a pixel circuit 800 of another embodiment. The pixel circuit 800 may be a pixel circuit Pnm (1≤m≤M, 1≤n≤N) in one of the pixels P11-PNM, with some variations. The pixel circuit 800 includes a switching transistor T2, driving transistors T1*a* and T1*b*, emission control transistors T3*a* and T3*b*, reset transistor T4, compensation transistors T5*a* and T5*b*, a reference control transistor T7, capacitors C1, C2, and a light emitting diode LED1. The switching transistor T2, the driving transistors T1*a* and T1*b*, the emission control transistor T3*a* and T3*b*, the reset transistor T4, compensation transistors T5*a* and T5*b*, and the reference control transistor T7 each include a first terminal, a second terminal and a control terminal.

The control terminals of the driving transistor T1*a* and T1*b* can be coupled to the second terminal of the reset transistor T4. The second terminal of the driving transistor T1*a* can be coupled to the first terminal of the emission control transistor T3*a*. The second terminal of the driving transistor T1*b* can be coupled to the first terminal of the emission control transistor T3*b*. The light emitting diode LED1 can be coupled to the second terminal of the emission control transistors T3*a* and the second terminal of the emission control transistor T3*b*. The control terminal of the reset transistor T4 can be coupled to a reset line Rn. The control terminal of the compensation transistor T5*a* can be coupled to a compensation line CAn, and the control terminal of the compensation transistor T5*b* can be coupled to another compensation line CBn. The capacitor C1 can be coupled between the control terminal of the driving transistor T1*a* and the voltage source PVDD. The capacitor C2 can be coupled between the second terminal of the switching transistor T2 and the control terminal of the driving transistor T1*a*. The second terminal of the compensation transistor T5*a* can be coupled to the control terminal of the driving transistor T1*a*, and the first terminal of the compensation transistor T5*a* can be coupled to the second terminal of the driving transistor T1*a*. The second terminal of the compensation transistor T5*b* can be coupled to the control terminal of the driving transistor T1*b*, and the first terminal of the compensation transistor T5*b* can be coupled to the second terminal of the driving transistor T1*b*. The control terminal of the switching transistor T2 can be coupled to a scan line Sn. The first terminal of the switching transistor T2 can be coupled to a data line Dm. The control terminal of the emission control transistor T3*a* can be coupled to an emission control line EAn, and the control terminal of the emission control transistor T3*b* can be coupled to another emission control line EBn. The control terminal of the reference control transistor T7 can be coupled to the scan line Sn. The second terminal of the reference control transistor T7 can be coupled to the second terminal of the switching transistor T2.

The scan line Sn provides a scan signal SCANn to the switching transistor T2, and the reference control transistor T7 so that the data line Dm writes the data signal DATAm to the control terminals of the driving transistors T1*a* and T1*b*. The voltage VREF is provided to the first terminal the reference control transistor T7 to provide a coupling voltage for the capacitor C2. The driving current is controlled by the driving transistors T1*a* and T1*b* according to the data signal DATAm with capacitive coupling of the capacitor C2. The capacitor C2 can be used to drive the driving transistors T1*a* and T1*b*. With a higher level of the data signal DATAm, a higher driving current through the driving transistor T1*a* or T1*b* can be produced. The voltage PVDD is provided to the first terminal of the driving transistor T1*a* and the first terminal of the driving transistor T1*b*, and the voltage PVSS is provided to the light-emitting diode LED1. Thus, a voltage difference of the pixel circuit 800 can be established to enable driving current to flow from the terminal of the voltage PVDD to the terminal of the voltage PVSS, where the voltage PVDD is greater than the voltage PVSS.

The reset line Rn provides a reset signal RSTn to the reset transistor T4. A voltage VRST is provided to the first terminal of the reset transistor T4. The reset transistor T4 functions to set the driving transistors T1*a* and T1*b* to receive the data signal DATAm for a following display frame cycle. The compensation lines CAn and CBn provide respectively the compensation signals CPAn and CPBn to independently control the compensation transistors T5*a* and T5*b*.

The emission control line EAn provides an emission control signal EMAn having a first duty cycle to the emission control transistor T3*a*. The emission control line EBn provides an emission control signal EMBn having a second duty cycle to the emission control transistor T3*b*. In some embodiments, the first duty cycle may be different from the second duty cycle, and in some other embodiments, the first duty cycle may be the same as the second duty cycle. The light emission period of the light-emitting diode LED1 is controlled by emission control transistors T3*a* and T3*b* according to the emission control signals EMAn and EMBn respectively.

The switching transistor T2, the driving transistors T1*a* and T1*b*, the emission control transistors T3*a* and T3*b*, the reset transistor T4, compensation transistors T5*a* and T5*b* can be p-type transistors. The reference control transistor T7 can be an n-type transistor. The driving transistor T1*a* and the driving transistor T1*b* have different channel width-to-length (W/L) ratios.

In some embodiments, the driving transistor T1*a* can be a low temperature poly-silicon (LTPS) thin-film transistor. In some embodiments, the driving transistor T1*b* can be an oxide thin-film transistor. In some embodiments, the driving transistor T1*a* can have W/L ratio of approximately 20 μm/5 μm=4 for a comparatively large current flow. In some embodiments, the driving transistor T1*b* can have W/L ratio of approximately 5 μm/25 μm=0.2 for a comparatively small current flow.

Figure 15A:
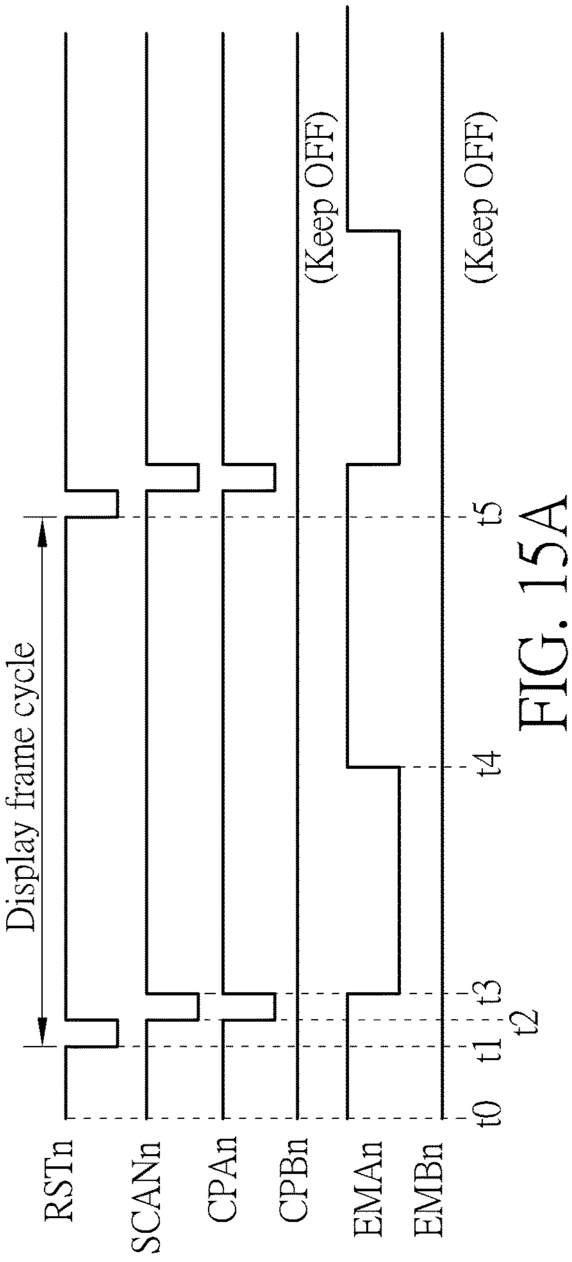
FIG. 15A illustrates a timing diagram of the operation signals of the pixel circuit of FIG. 14 of an embodiment according to the high brightness mode.
Figure 15B:
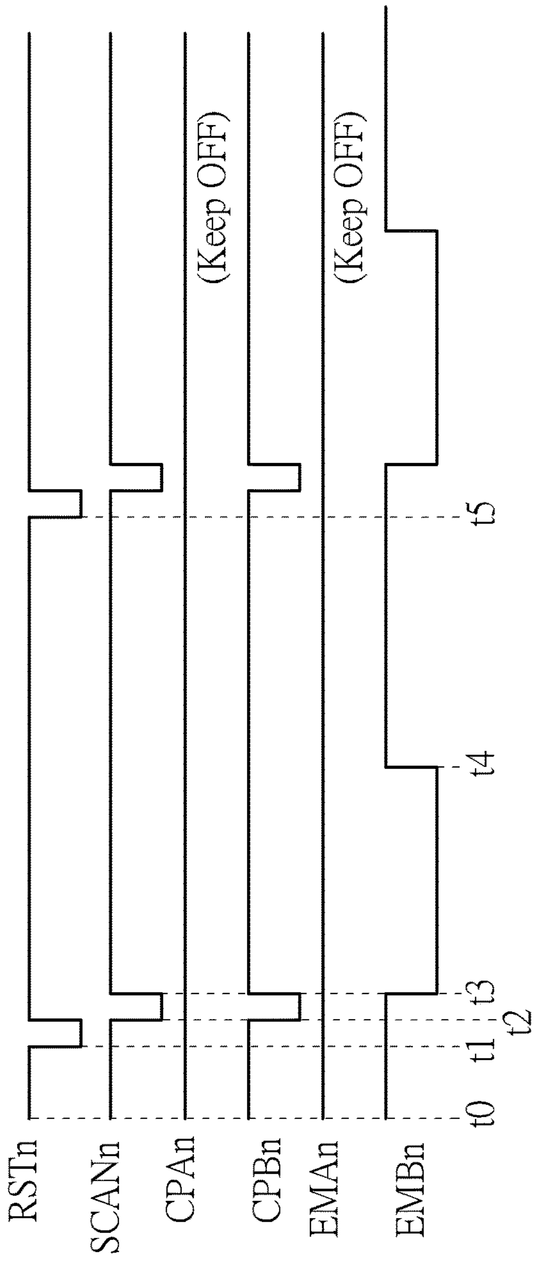
FIG. 15B illustrates a timing diagram of the operation signals of the pixel circuit of FIG. 14 according to the low brightness mode of an embodiment.

Please refer to both FIGS. 15A and 15B. FIG. 15A illustrates a timing diagram of the operation signals of the pixel circuit 800 of an embodiment according to the high brightness mode. Initially at time to, the reset signal RSTn, the scan signal SCANn, the emission control signals EMAn and EMBn, and the compensation signals CPAn and CPBn are at high levels. Thus, the initial states of the switching transistor T2, the emission control transistors T3*a* and T3*b*, and the reset transistor T4, compensation transistors T5*a* and T5*b*, and the reference control transistor T7 are turned off. Between time t1 and t2, a low pulse occurs in the reset signal RSTn to turn on the reset transistor T4 allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn to turn on the switching transistor T2, and the reference transistor T7, allowing the data signal DATAm to pass through the switching transistor T2 and coupled to the capacitor C2, thus controlling the driving transistors T1*a* and T1*b*. At the same time, a low pulse occurs in the compensation signal CPAn to turn on the compensation transistor T5*a*. The compensation signal CPBn is maintained at the high level. Between time t3 and t4, a low pulse occurs in the emission control signal EMAn to turn on the emission control transistor T3*a*. The emission control signal EMBn is maintained at the high level to keep the emission control transistor T3*b* turned off. Thus, during this time period, a large driving current can flow from the terminal of the voltage PVDD to the terminal of the voltage PVSS to drive the light emitting diode LED1 for the high brightness mode display. At time t5, another display frame cycle begins. The behavior of the operation signals is similar for the various display frame cycles and the description is not repeated herein for brevity.

FIG. 15B illustrates a timing diagram of the operation signals of the pixel circuit 800 according to the low brightness mode of an embodiment. Initially at time to, the reset signal RSTn, the scan signal SCANn, the emission control signals EMAn and EMBn, and the compensation signals CPAn and CPBn are at high levels. Thus, the initial states of the driving transistors T1*a* and T1*b*, the switching transistor T2, the emission control transistors T3*a* and T3*b*, and the reset transistor T4, compensation transistors T5*a* and T5*b*, and the reference control transistor T7 are turned off. Between time t1 and t2, a low pulse occurs in the reset signal RSTn to turn on the reset transistor T4 allowing the voltage VRST to reset the driving transistors T1*a* and T1*b*. This mechanism ensures that the driving transistors T1*a* and T1*b* can be turned on during the following display frame cycle. The display frame cycle starts at time t2. Between time t2 and t3, a low pulse occurs in the scan signal SCANn to turn on the switching transistor T2, and the reference transistor T7, allowing the data signal DATAm to pass through the switching transistor T2 and coupled to the capacitor C2, thus controlling the driving transistors T1*a* and T1*b*. At the same time, a low pulse occurs in the compensation signal CPBn to turn on the compensation transistor T5*b*. The compensation signal CPAn is maintained at the high level. Between time t3 and t4, a low pulse occurs in the emission control signal EMBn to turn on the emission control transistors T3*b*. The emission control signal EMAn is maintained at the high level to keep the emission control transistor T3*a* turned off. Thus, during this time period, a small driving current can flow from the terminal of the voltage PVDD to the terminal of the voltage PVSS to drive the light emitting diode LED1 for the low brightness mode display. At time t5, another display frame cycle begins. The behavior of the operation signals is similar for the various display frame cycles and the description is not repeated herein for brevity.

In the above-mentioned embodiments, the control terminal of a transistor may be a gate; the first terminal of a transistor may be a source; the second terminal of a transistor may be a drain. The source and the drain may be reversed according to the implementation.

Figure 16:
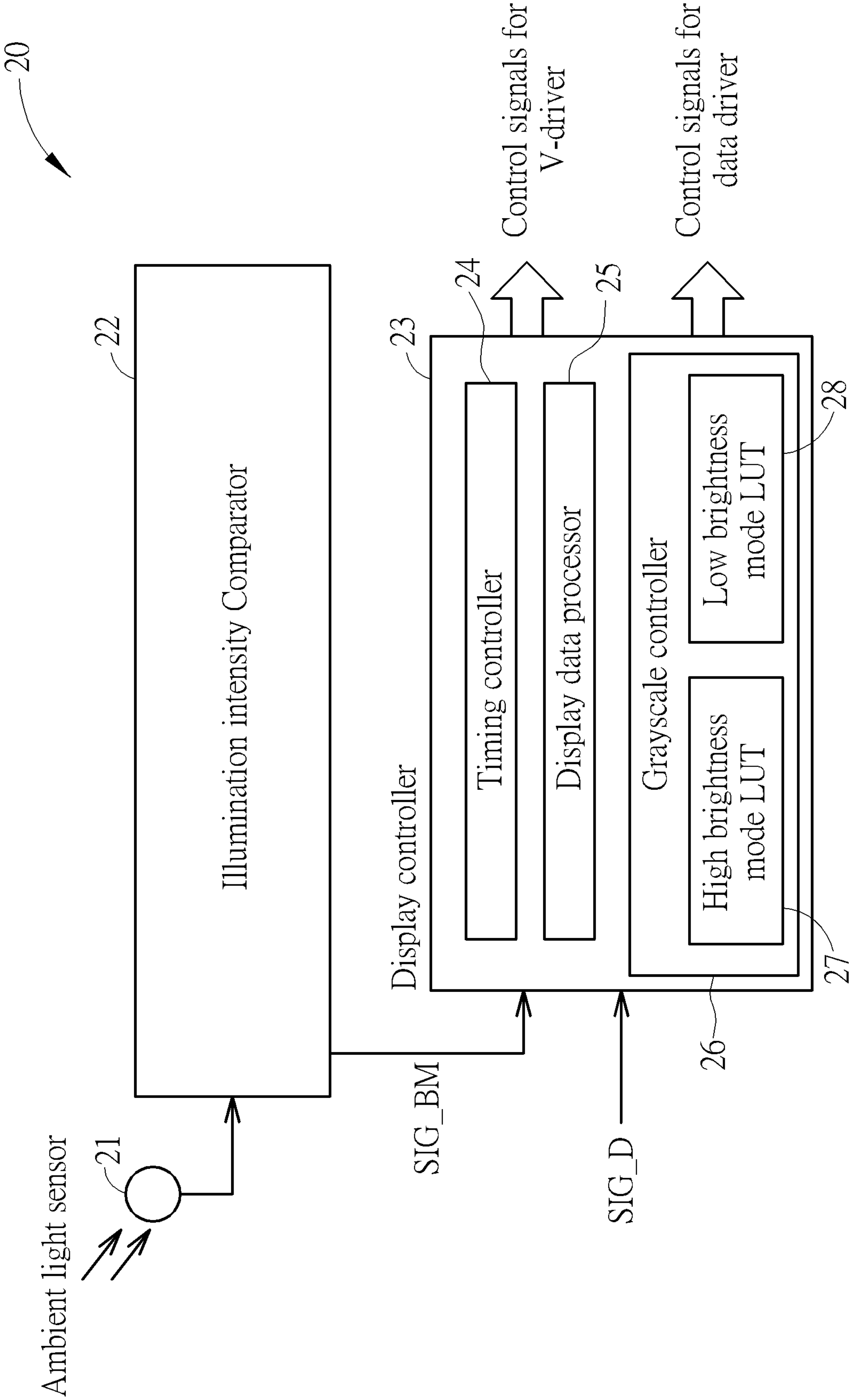
FIG. 16 illustrates a brightness mode control system of an embodiment.

FIG. 16 illustrates a brightness mode control system 20 of an embodiment. The brightness mode control system 20 may be coupled to the display panel 10 and includes an ambient light sensor 21, an illumination intensity comparator 22 coupled to the ambient light sensor 21, a display controller 23 coupled to the illumination intensity comparator 22. The display controller 23 has a timing controller 24, a display data processor 25 and a grayscale controller 26. The grayscale controller 26 has a high brightness mode LUT (look-up table) 27 and a low brightness mode LUT 28.

The ambient light sensor 21 can detect an intensity of the ambient light. The illumination intensity comparator 22 can determine whether to enable the high brightness mode or the low brightness mode according to the intensity of the ambient light, and to generate a brightness mode signal SIG_BM. The timing controller 24 works with the display processor 25 to generate control signals for the vertical driver 2 (e.g., scan signals, emission control signals, reset signals and compensation signals) according to the brightness mode signal SIG_BM and the display signal SIG_D. The grayscale controller 26 can generate control signals (e.g., data signals and gamma voltages) for the data driver 3 according to the brightness mode signal SIG_BM and the display signal SIG_D. Furthermore, if the illumination intensity comparator 22 determines to enable the high brightness mode, the high brightness mode LUT 27 would be used for generating the data driver control signals. On the other hand, if the illumination intensity comparator 22 determines to enable the low brightness mode, the low brightness mode LUT 28 would be used for generating the data driver control signals.

In the various embodiments disclosed above, a wide range of brightness mode for display can be achieved and the accuracy of grayscale can be improved, particularly in the low brightness mode.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A pixel circuit comprising:

a switching transistor;

a first driving transistor coupled to the switching transistor;

a second driving transistor coupled to the switching transistor;

a first emission control transistor coupled to the first driving transistor;

a second emission control transistor coupled to the second driving transistor;

a light emitting diode coupled to the first emission control transistor and the second emission control transistor;

a first reset transistor coupled to a control terminal of the first driving transistor;

a second reset transistor coupled to a control terminal of the second driving transistor;

a first compensation transistor coupled to a second terminal of the first driving transistor;

a second compensation transistor coupled to a second terminal of the second driving transistor;

a third emission control transistor coupled to a first terminal of the first driving transistor;

a fourth emission control transistor coupled to a first terminal of the second driving transistor;

a first capacitor coupled to a control terminal of the first driving transistor; and a second capacitor coupled to a control terminal of the second driving transistor.

2. The pixel circuit of claim 1, wherein the first driving transistor and the second driving transistor comprise different semiconductor materials.

3. The pixel circuit of claim 2, wherein the first driving transistor is a low temperature poly-silicon (LTPS) thin-film transistor.

4. The pixel circuit of claim 2, wherein the second driving transistor is an oxide thin-film transistor.

5. The pixel circuit of claim 1, wherein the first driving transistor and the second driving transistor have different channel width-to-length ratios.

6. The pixel circuit of claim 1, wherein the first driving transistor, the second driving transistor, the first emission control transistor, and the second emission control transistor are n-type transistors.

7. The pixel circuit of claim 1, wherein the first driving transistor, the second driving transistor, the first emission control transistor, and the second emission control transistor are p-type transistors.

8. The pixel circuit of claim 1 further comprising:
a first emission control line coupled to the first emission control transistor; and
a second emission control line coupled to the second emission control transistor;
wherein the first emission control line provides a first signal having a first duty cycle to the first emission control transistor, the second emission control line provides a second signal having a second duty cycle to the second emission control transistor.

9. The pixel circuit of claim 1 further comprising:
a reset line coupled to a control terminal of the first reset transistor and a control terminal of the second reset transistor; and
a scan line coupled to a control terminal of the switching transistor, a control terminal of the first compensation transistor and a control terminal of the second compensation transistor;
a first emission control line coupled to a control terminal of the first emission control transistor and to a control terminal of the third emission control transistor; and
a second emission control line coupled to a control terminal of the second emission control transistor and to a control terminal of the fourth emission control transistor;
wherein:
the first emission control line provides a first signal having a first duty cycle to the first emission control transistor and the third emission control transistor, the second emission control line provides a second signal having a second duty cycle to the second emission control transistor and the fourth emission control transistor; and
the reset line provides a reset signal to the first reset transistor and the second reset transistor.

10. The pixel circuit of claim 1, wherein the first reset transistor, the second reset transistor, the first compensation transistor, the second compensation transistor, the third emission control transistor and the fourth emission control transistor are p-type transistors.

11. A pixel circuit comprising:
a switching transistor;
a first driving transistor coupled to the switching transistor;
a second driving transistor coupled to the switching transistor;
a first emission control transistor coupled to the first driving transistor;
a second emission control transistor coupled to the second driving transistor; and
a light emitting diode coupled to the first emission control transistor and the second emission control transistor;
a first reset transistor coupled to a control terminal of the first driving transistor;
a first compensation transistor coupled to a second terminal of the first driving transistor;
a second compensation transistor coupled to a second terminal of the second driving transistor;
a third emission control transistor coupled to a first terminal of the first driving transistor;
a fourth emission control transistor coupled to a first terminal of the second driving transistor; and
a first capacitor coupled to a control terminal of the first driving transistor and a control terminal of the second driving transistor.

12. The pixel circuit of claim 11 further comprising:
a reset line coupled to a control terminal of the first reset transistor; and
a scan line coupled to a control terminal of the switching transistor;
a first emission control line coupled to a control terminal of the first emission control transistor and to a control terminal of the third emission control transistor; and
a second emission control line coupled to a control terminal of the second emission control transistor and to a control terminal of the fourth emission control transistor;
a first compensation line coupled to a control terminal of first compensation transistor; and
a second compensation line coupled to a control terminal of second compensation transistor;
wherein:
the first emission control line provides a first signal having a first duty cycle to the first emission control transistor and the third emission control transistor, the second emission control line provides a second signal having a second duty cycle to the second emission control transistor and the fourth emission control transistor;
the reset line provides a reset signal to the first reset transistor; and
the first compensation line provides a first compensation signal to the first compensation transistor and the second compensation line provides a second compensation signal the second compensation transistor.

13. The pixel circuit of claim 11, wherein the first driving transistor and the second driving transistor have different channel width-to-length ratios.

14. The pixel circuit of claim 11, wherein the first driving transistor and the second driving transistor comprise different semiconductor materials.

15. A pixel circuit comprising:
a switching transistor;
a first driving transistor coupled to the switching transistor;
a second driving transistor coupled to the switching transistor;
a first emission control transistor coupled to the first driving transistor;
a second emission control transistor coupled to the second driving transistor;
a light emitting diode coupled to the first emission control transistor and the second emission control transistor;
a first reset transistor coupled to a control terminal of the first driving transistor;
a first compensation transistor coupled to a second terminal of the first driving transistor;
a second compensation transistor coupled to a second terminal of the second driving transistor;
a reference control transistor coupled to a second terminal of the switching transistor;
a first capacitor coupled to a control terminal of the first driving transistor; and a third capacitor coupled between a second terminal of the reference control transistor and a control terminal of the first driving transistor.

16. The pixel circuit of claim 15 further comprising:

a reset line coupled to a control terminal of the first reset transistor; and a scan line coupled to a control terminal of the switching transistor;

a first emission control line coupled to a control terminal of the first emission control transistor;

a second emission control line coupled to a control terminal of the second emission control transistor;

a first compensation line coupled to a control terminal of first compensation transistor; and a second compensation line coupled to a control terminal of second compensation transistor;

wherein:

the first emission control line provides a first signal having a first duty cycle to the first emission control transistor and the third emission control transistor, the second emission control line provides a second signal having a second duty cycle to the second emission control transistor and the fourth emission control transistor;

the reset line provides a reset signal to the first reset transistor; and the first compensation line provides a first compensation signal to the first compensation transistor and the second compensation line provides a second compensation signal the second compensation transistor.

17. The pixel circuit of claim 15, wherein the first driving transistor and the second driving transistor comprise different semiconductor materials.

18. The pixel circuit of claim 15, wherein the first driving transistor and the second driving transistor have different channel width-to-length ratios.

19. The pixel circuit of claim 15, further comprising:

a second reset transistor coupled to a control terminal of the second driving transistor;

a second capacitor coupled to the control terminal of the second driving transistor; and a fourth capacitor coupled between a second terminal of the reference control transistor and the control terminal of the second driving transistor.

20. The pixel circuit of claim 19, further comprising:

a reset line coupled to a control terminal of the first reset transistor and a control terminal of the second reset transistor; and a scan line coupled to a control terminal of the switching transistor, a control terminal of the first compensation transistor and a control terminal of the second compensation transistor;

a first emission control line coupled to a control terminal of the first emission control transistor; and a second emission control line coupled to a control terminal of the second emission control transistor;

wherein:

the first emission control line provides a first signal having a first duty cycle to the first emission control transistor, the second emission control line provides a second signal having a second duty cycle to the second emission control transistor; and the reset line provides a reset signal to the first reset transistor and the second reset transistor.

* * * * *